United States Patent
Damnjanovic et al.

(10) Patent No.: US 10,517,116 B2
(45) Date of Patent: Dec. 24, 2019

(54) CONTENTION-BASED DATA TRANSMISSIONS ON RETURN LINK

(71) Applicant: QUALCOMM Incorporated, San Diego, CA (US)

(72) Inventors: Jelena Damnjanovic, Del Mar, CA (US); Qiang Wu, San Diego, CA (US); Fatih Ulupinar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/996,999

(22) Filed: Jun. 4, 2018

(65) Prior Publication Data

US 2018/0288798 A1 Oct. 4, 2018

Related U.S. Application Data

(62) Division of application No. 15/243,895, filed on Aug. 22, 2016, now Pat. No. 10,009,923.
(Continued)

(51) Int. Cl.
| | | |
|---|---|---|
| *H04W 74/08* | (2009.01) | |
| *H04B 7/185* | (2006.01) | |
| *H04W 72/12* | (2009.01) | |
| *H04W 28/02* | (2009.01) | |
| *H04W 88/16* | (2009.01) | |

(52) U.S. Cl.
CPC ........ *H04W 74/08* (2013.01); *H04B 7/18517* (2013.01); *H04B 7/18539* (2013.01); *H04W 28/0278* (2013.01); *H04W 72/1284* (2013.01); *H04W 88/16* (2013.01)

(58) Field of Classification Search
CPC . H04W 74/08; H04W 74/00; H04W 72/1284; H04W 28/0278; H04W 88/16; H04B 7/18539; H04B 7/18517
See application file for complete search history.

(56) References Cited

U.S. PATENT DOCUMENTS

| | | |
|---|---|---|
| 4,745,599 A | 5/1988 | Raychaudhuri |
| 6,847,626 B1 | 1/2005 | Carneal et al. |
(Continued)

FOREIGN PATENT DOCUMENTS

WO   WO-2010057540 A1   5/2010

OTHER PUBLICATIONS

International Search Report and Written Opinion—PCT/US2016/069339—ISA/EPO—Apr. 13, 2017.

*Primary Examiner* — Phuc H Tran
(74) *Attorney, Agent, or Firm* — Paradice and Li LLP

(57) ABSTRACT

Methods and apparatuses are disclosed for a network controller to receive data from a user terminal (UT) via a satellite in a satellite system. The network controller may allocate contention-based resources of the satellite system to a plurality of UTs, and may activate the allocated contention-based resources by transmitting an activation signal to the plurality of UTs. The network controller may receive, from a first UT via a satellite of the satellite system, a first portion of data on a plurality of subframes of the contention-based resources during a time period, and may suspend the allocation of contention-based resources after an expiration of the time period or upon a grant of scheduled return link resources to the first UT, irrespective of collisions on the contention-based resources.

24 Claims, 20 Drawing Sheets

Related U.S. Application Data

(60) Provisional application No. 62/288,336, filed on Jan. 28, 2016.

(56) References Cited

U.S. PATENT DOCUMENTS

| | | | |
|---|---|---|---|
| 8,625,442 B2 | 1/2014 | Ratasuk et al. | |
| 8,767,644 B2 | 7/2014 | Wager et al. | |
| 8,861,449 B2 | 10/2014 | Wager et al. | |
| 9,179,474 B2 | 11/2015 | Torsner et al. | |
| 9,191,828 B2 | 11/2015 | Li et al. | |
| 2006/0171418 A1* | 8/2006 | Casini | H04B 7/18582 370/474 |
| 2011/0263286 A1* | 10/2011 | Damnjanovic | H04W 74/008 455/513 |
| 2015/0003383 A1* | 1/2015 | Wager | H04L 1/1812 370/329 |
| 2017/0223735 A1 | 8/2017 | Damnjanovic et al. | |
| 2017/0367058 A1* | 12/2017 | Pelletier | H04W 56/0045 |

\* cited by examiner

CONTENTION-BASED DATA TRANSMISSIONS ON RETURN LINK

CROSS-REFERENCE TO RELATED APPLICATIONS

This patent application is a divisional application of and claims priority under 35 USC § 120 to co-pending U.S. patent application Ser. No. 15/243,895 entitled "CONTENTION-BASED DATA TRANSMISSIONS ON RETURN LINK" filed on Aug. 22, 2016, which claims priority under 35 USC § 119(e) to U.S. Provisional Patent Application No. 62/288,336 entitled "CONTENTION-BASED DATA TRANSMISSIONS ON RETURN LINK" filed on Jan. 28, 2016, all assigned to the assignee hereof. The disclosures of all prior applications are considered part of and are incorporated by reference in this patent application.

INTRODUCTION

Various aspects described herein relate to satellite communications, and more particularly to reducing transmission delays in a satellite system.

Conventional satellite-based communication systems include gateways and one or more satellites to relay communication signals between the gateways and one or more user terminals. A gateway is an Earth station having an antenna for transmitting signals to, and receiving signals from, communication satellites. A gateway provides communication links, using satellites, for connecting a user terminal to other user terminals or users of other communication systems, such as a public switched telephone network, the internet and various public and/or private networks. A satellite is an orbiting receiver and repeater used to relay information.

A satellite can receive signals from and transmit signals to a user terminal provided the user terminal is within the "footprint" of the satellite. The footprint of a satellite is the geographic region on the surface of the Earth within the range of signals of the satellite. The footprint is usually geographically divided into "beams," through the use of one or more antennas. Each beam covers a particular geographic region within the footprint. Beams may be directed so that more than one beam from the same satellite covers the same specific geographic region.

Geosynchronous satellites have long been used for communications. A geosynchronous satellite is stationary relative to a given location on the Earth, and thus there is little timing shift and frequency shift in radio signal propagation between a communication transceiver on the Earth and the geosynchronous satellite. However, because geosynchronous satellites are limited to a geosynchronous orbit (GSO), the number of satellites that may be placed in the GSO is limited. As alternatives to geosynchronous satellites, communication systems which utilize a constellation of satellites in non-geosynchronous orbits (NGSO), such as low-earth orbits (LEO), have been devised to provide communication coverage to the entire Earth or at least large parts of the Earth.

Although NGSO satellites (e.g., LEO satellites) orbit the Earth at much lower altitudes than GSO satellites, data transmission delays associated with NGSO satellite communications may degrade user experience, especially for real-time data such as voice and video data. Thus, there is a need to reduce the data transmission delays associated with NGSO satellite communications.

SUMMARY

Aspects of the disclosure are directed to apparatuses and methods for facilitating communications in a satellite system. In some implementations, a user terminal may transit data to a gateway via a satellite. In one example, a method of wireless communication performed by a user terminal in a satellite system is disclosed. The method may include receiving data for transmission to a gateway via a satellite; receiving, from the gateway, an activation of contention-based resources of the satellite system; transmitting, during a time period, a first portion of the data on a plurality of subframes of the contention-based resources prior to receiving a grant of scheduled return link resources; and terminating data transmissions on the contention-based resources after an expiration of the time period or upon receiving the grant of scheduled return link resources, irrespective of collisions on the contention-based resources.

In another example, a user terminal configured for wireless communication in a satellite system is disclosed. The user terminal may include one or more processors and a memory configured to store instructions. Execution of the instructions by the one or more processors may cause the user terminal to receive data for transmission to a gateway via a satellite; receive, from the gateway, an activation of contention-based resources of the satellite system; transmit, during a time period, a first portion of the data on a plurality of subframes of the contention-based resources prior to receiving a grant of scheduled return link resources; and terminate data transmissions on the contention-based resources after an expiration of the time period or upon receiving the grant of scheduled return link resources, irrespective of collisions on the contention-based resources.

In another example, a user terminal configured for wireless communication in a satellite system is disclosed. The user terminal may include means for receiving data for transmission to a gateway via a satellite; means for receiving, from the gateway, an activation of contention-based resources of the satellite system; means for transmitting, during a time period, a first portion of the data on a plurality of subframes of the contention-based resources prior to receiving a grant of scheduled return link resources; and means for terminating data transmissions on the contention-based resources after an expiration of the time period or upon receiving the grant of scheduled return link resources, irrespective of collisions on the contention-based resources.

In another example, a non-transitory computer-readable medium is disclosed. The non-transitory computer-readable medium may store instructions that, when executed by one or more processors of a user terminal, cause the user terminal to perform operations that may include receiving data for transmission to a gateway via a satellite; receiving, from the gateway, an activation of contention-based resources of the satellite system; transmitting, during a time period, a first portion of the data on a plurality of subframes of the contention-based resources system prior to receiving a grant of scheduled return link resources; and terminating data transmissions on the contention-based resources after an expiration of the time period or upon receiving the grant of scheduled return link resources, irrespective of collisions on the contention-based resources.

In other implementations, a network controller may receive data from a user terminal via a satellite. In one example, a method of wireless communication performed by a network controller in a satellite system is disclosed. The method may include allocating contention-based resources of the satellite system to a plurality of user terminals (UTs); activating the allocated contention-based resources by transmitting an activation signal to the plurality of UTs; receiving, from a first UT via a satellite of the satellite system, a first portion of data on a plurality of subframes of the contention-based resources during a time period; and suspending the allocation of the contention-based resources to the first UT after an expiration of the time period or upon a grant of scheduled return link resources to the first UT, irrespective of collisions on the contention-based resources.

In another example, a network controller configured for wireless communication in a satellite system is disclosed. The network controller may include one or more processors and a memory configured to store instructions. Execution of the instructions by the one or more processors may cause the network controller to allocate contention-based resources of the satellite system to a plurality of user terminals (UTs); activate the allocated contention-based resources by transmitting an activation signal to the plurality of UTs; receive, from a first UT via a satellite of the satellite system, a first portion of data on a plurality of subframes of the contention-based resources during a time period; and suspend the allocation of the contention-based resources to the first UT after an expiration of the time period or upon a grant of scheduled return link resources to the first UT, irrespective of collisions on the contention-based resources.

In another example, a non-transitory computer-readable medium is disclosed. The non-transitory computer-readable medium may store instructions that, when executed by one or more processors of a network controller, cause the network controller to perform operations that may include allocating contention-based resources of the satellite system to a plurality of user terminals (UTs); activating the allocated contention-based resources by transmitting an activation signal to the plurality of UTs; receiving, from a first UT via a satellite of the satellite system, a first portion of data on a plurality of subframes of the contention-based resources during a time period; and suspending the allocation of the contention-based resources to the first UT after an expiration of the time period or upon a grant of scheduled return link resources to the first UT, irrespective of collisions on the contention-based resources.

In another example, a network controller configured for wireless communication in a satellite system is disclosed. The network controller may include means for allocating contention-based resources of the satellite system to a plurality of user terminals (UTs); means for activating the allocated contention-based resources by transmitting an activation signal to the plurality of UTs; means for receiving, from a first UT via a satellite of the satellite system, a first portion of data on a plurality of subframes of the contention-based resources during a time period; and means for suspending the allocation of the contention-based resources to the first UT after an expiration of the time period or upon a grant of scheduled return link resources to the first UT, irrespective of collisions on the contention-based resources.

BRIEF DESCRIPTION OF THE DRAWINGS

Aspects of this disclosure are illustrated by way of example and are not intended to be limited by the figures of the accompanying drawings.

DETAILED DESCRIPTION

Figure 1:
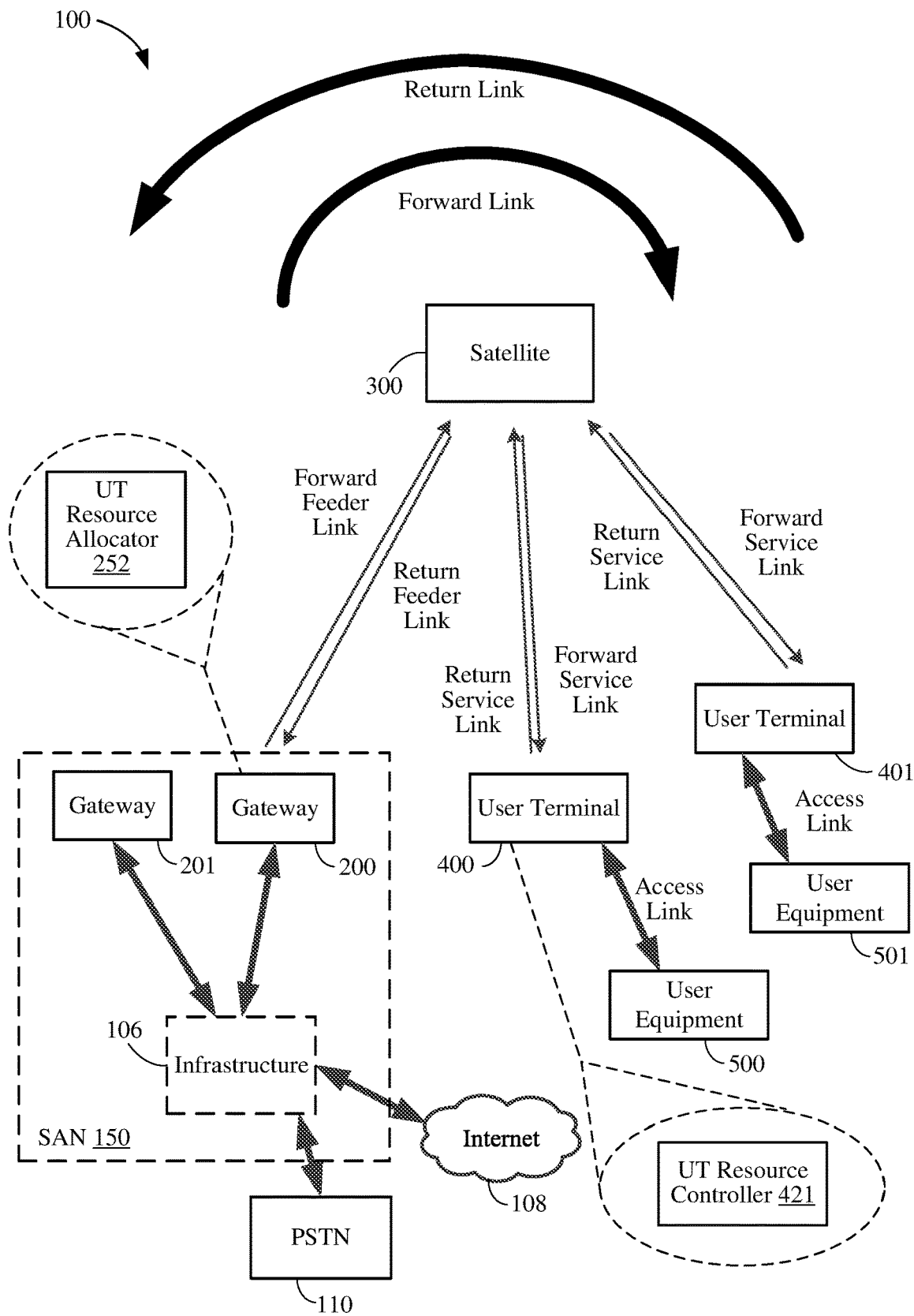
FIG. 1 shows a block diagram of an example communication system.

The example implementations described herein may reduce data transmission delays associated with NGSO satellite communications. As described in more detail below, a user terminal having buffered data for transmission to a gateway via one or more satellites of a satellite system may begin transmitting the data to the gateway using contention-based resources of the satellite system without an explicit grant of scheduled return link resources of the satellite system. The user terminal may transmit, on the contention-based resources, a scheduling request for a grant of the scheduled return link resources. The user terminal may continue transmitting data on the contention-based resources until the scheduled return link resources are granted to the user terminal. Thereafter, the user terminal may transmit a remaining portion of the data (e.g., a second portion of the data) on the scheduled return link resources. Because the user terminal may begin transmitting data to the gateway prior to receiving the grant of scheduled return link resources, data transmission delays may be reduced (e.g., as compared to conventional communication systems). More specifically, allowing the user terminal to begin transmitting data prior to receiving a grant of scheduled return link resources may avoid scheduling request opportunity delays, signal propagation delays associated with requesting and receiving the grant of scheduled return link resources, and processing delays associated with the gateway, thereby minimizing data transmission delays associated with the satellite system.

Aspects of the disclosure are described in the following description and related drawings directed to specific examples. Alternate examples may be devised without departing from the scope of the disclosure. Additionally, well-known elements will not be described in detail or will be omitted so as not to obscure the relevant details of the disclosure.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage or mode of operation.

The terminology used herein is for the purpose of describing particular aspects only and is not intended to be limiting of the aspects. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Further, many aspects are described in terms of sequences of actions to be performed by, for example, elements of a computing device. It will be recognized that various actions described herein can be performed by specific circuits, for example, central processing units (CPUs), graphic processing units (GPUs), digital signal processors (DSPs), application specific integrated circuits (ASICs), field programmable gate arrays (FPGAs), or various other types of general purpose or special purpose processors or circuits, by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

In the following description, numerous specific details are set forth such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the various aspects of the present disclosure. In other instances, well-known circuits and devices are shown in block diagram form to avoid obscuring the present disclosure. The various aspects of the present disclosure are not to be construed as limited to specific examples described herein but rather to include within their scopes all implementations defined by the appended claims.

FIG. 1 illustrates an example of a satellite communication system 100 which includes a plurality of satellites (although only one satellite 300 is shown for clarity of illustration) in non-geosynchronous orbits, for example, low-earth orbits (LEO), satellite access network (SAN) 150 in communication with the satellite 300, a plurality of user terminals (UTs) 400 and 401 in communication with the satellite 300, and a plurality of user equipment (UE) 500 and 501 in communication with the UTs 400 and 401, respectively. Each UE 500 or 501 may be a user device such as a mobile device, a telephone, a smartphone, a tablet, a laptop computer, a computer, a wearable device, a smart watch, an audiovisual device, or any device including the capability to communicate with a UT. Additionally, the UE 500 and/or UE 501 may be a device (e.g., access point, small cell, etc.) that is used to communicate to one or more end user devices. In the example illustrated in FIG. 1, the UT 400 and the UE 500 communicate with each other via a bidirectional access link (having a forward access link and return access link), and similarly, the UT 401 and the UE 501 communicate with each other via another bidirectional access link. In another implementation, one or more additional UE (not shown) may be configured to receive only and therefore communicate with a UT only using a forward access link. In another implementation, one or more additional UE (not shown) may also communicate with UT 400 or UT 401.

Alternatively, a UT and a corresponding UE may be integral parts of a single physical device, such as a mobile telephone with an integral satellite transceiver and an antenna for communicating directly with a satellite, for example.

The UT 400 may include a UT resource controller 421 that may allow the UT 400 to transmit buffered data to a gateway (e.g., gateway 200 or gateway 201) via a satellite (e.g., satellite 300) using contention-based resources of the satellite system 100. For at least some example implementations, the UT resource controller 421 may allow the UT 400 to transmit, during a time period, a first portion of buffered data on contention-based resources allocated by the SAN 150 prior to receiving a grant of scheduled return link resources. The UT resource controller 421 may also allow the UT 400 to transmit, during the time period, a request for the grant of scheduled return link resources and/or a buffer status report on the contention-based resources. In some aspects, the UT resource controller 421 may cause the UT 400 to terminate data transmissions on the contention-based resources (e.g., after expiration of the time period or after receiving the grant of scheduled return link resources). Upon receiving the grant of the scheduled RL resources, the UT resource controller 421 may allow the UT 400 to transmit additional portions of the buffered data to the gateway 200 or 201, via satellite 300, on the scheduled return link resources granted by the SAN 150.

The SAN 150 may include gateways 200 and 201, infrastructure 106, and additional components (not shown for simplicity) for communicating with the satellite 300. The gateway 200 may have access to the Internet 108 or one or more other types of public, semiprivate or private networks. In the example illustrated in FIG. 1, the gateway 200 is in communication with infrastructure 106, which is capable of accessing the Internet 108 or one or more other types of public, semiprivate or private networks. The gateway 200 may also be coupled to various types of communication backhaul, including, for example, landline networks such as optical fiber networks or public switched telephone networks (PSTN) 110. Further, in alternative implementations, the gateway 200 may interface to the Internet 108, PSTN 110, or one or more other types of public, semiprivate or private networks without using infrastructure 106. Still further, gateway 200 may communicate with other gateways, such as gateway 201 through the infrastructure 106 or alternatively may be configured to communicate to gateway 201 without using infrastructure 106. Infrastructure 106 may include, in whole or part, a network control center (NCC), a satellite control center (SCC), a wired and/or wireless core network and/or any other components or systems used to facilitate operation of and/or communication with the satellite communication system 100. In some implementations, gateway 200 may include a UT resource allocator 252 that may allocate contention-based resources to one or more UTs (e.g., UTs 400 and 401), for example, as described in more detail below with respect to FIG. 2.

Communications between the satellite 300 and the gateway 200 in both directions are called feeder links, whereas communications between the satellite and each of the UTs 400 and 401 in both directions are called service links. A signal path from the satellite 300 to a ground station, which may be the gateway 200 or one of the UTs 400 and 401, may be generically called a downlink. A signal path from a ground station to the satellite 300 may be generically called an uplink. Additionally, as illustrated, signals can have a general directionality such as a forward link and a return link or reverse link. Accordingly, a communication link in a direction originating from the gateway 200 and terminating at the UT 400 through the satellite 300 is called a forward link, whereas a communication link in a direction originating from the UT 400 and terminating at the gateway 200 through the satellite 300 is called a return link or reverse link. As such, the signal path from the gateway 200 to the satellite 300 is labeled "Forward Feeder Link" whereas the signal path from the satellite 300 to the gateway 200 is labeled "Return Feeder Link" in FIG. 1. In a similar manner, the signal path from each UT 400 or 401 to the satellite 300 is labeled "Return Service Link" whereas the signal path from the satellite 300 to each UT 400 or 401 is labeled "Forward Service Link" in FIG. 1.

Figure 2:
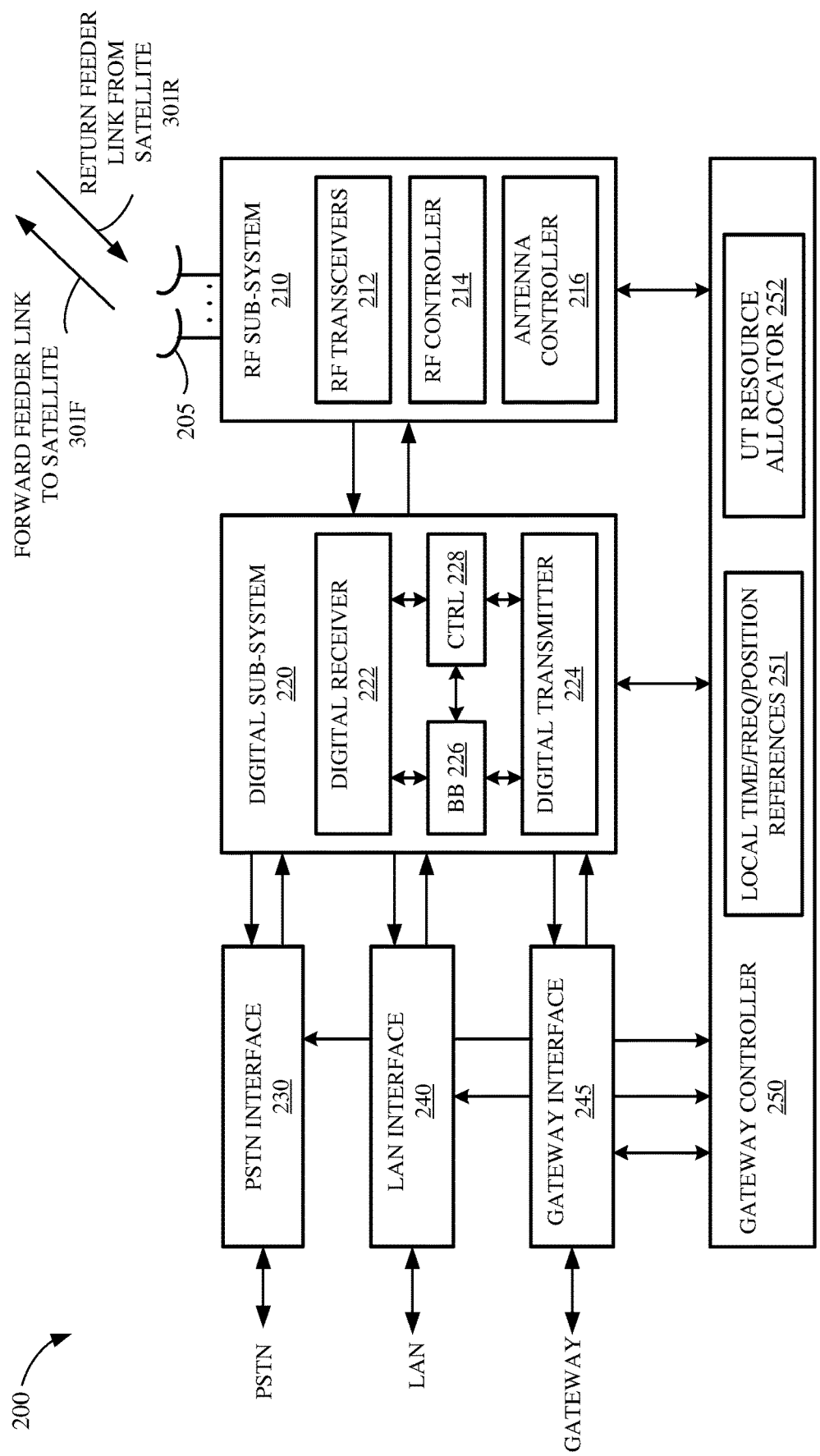
FIG. 2 shows a block diagram of one example of the gateway of FIG. 1.

FIG. 2 is an example block diagram of gateway 200, which also can apply to gateway 201 of FIG. 1. Gateway 200 is shown to include a number of antennas 205, an RF subsystem 210, a digital subsystem 220, a Public Switched Telephone Network (PSTN) interface 230, a Local Area Network (LAN) interface 240, a gateway interface 245, and a gateway controller 250. RF subsystem 210 is coupled to antennas 205 and to digital subsystem 220. Digital subsystem 220 is coupled to PSTN interface 230, to LAN interface 240, and to gateway interface 245. Gateway controller 250 is coupled to RF subsystem 210, digital subsystem 220, PSTN interface 230, LAN interface 240, and gateway interface 245.

RF subsystem 210, which may include a number of RF transceivers 212, an RF controller 214, and an antenna controller 216, may transmit communication signals to satellite 300 via a forward feeder link 301F, and may receive communication signals from satellite 300 via a return feeder link 301R. Although not shown for simplicity, each of the RF transceivers 212 may include a transmit chain and a receive chain. Each receive chain may include a low noise amplifier (LNA) and a down-converter (e.g., a mixer) to amplify and down-convert, respectively, received communication signals in a well-known manner. In addition, each receive chain may include an analog-to-digital converter (ADC) to convert the received communication signals from analog signals to digital signals (e.g., for processing by digital subsystem 220). Each transmit chain may include an up-converter (e.g., a mixer) and a power amplifier (PA) to up-convert and amplify, respectively, communication signals to be transmitted to satellite 300 in a well-known manner. In addition, each transmit chain may include a digital-to-analog converter (DAC) to convert the digital signals received from digital subsystem 220 to analog signals to be transmitted to satellite 300.

The RF controller 214 may be used to control various aspects of the number of RF transceivers 212 (e.g., selection of the carrier frequency, frequency and phase calibration, gain settings, and the like). The antenna controller 216 may control various aspects of the antennas 205 (e.g., beamforming, beam steering, gain settings, frequency tuning, and the like).

The digital subsystem 220 may include a number of digital receiver modules 222, a number of digital transmitter modules 224, a baseband (BB) processor 226, and a control (CTRL) processor 228. Digital subsystem 220 may process communication signals received from RF subsystem 210 and forward the processed communication signals to PSTN interface 230 and/or LAN interface 240, and may process communication signals received from PSTN interface 230 and/or LAN interface 240 and forward the processed communication signals to RF subsystem 210.

Each digital receiver module 222 may correspond to signal processing elements used to manage communications between gateway 200 and UT 400. One of the receive chains of RF transceivers 212 may provide input signals to multiple digital receiver modules 222. A number of digital receiver modules 222 may be used to accommodate all of the satellite beams and possible diversity mode signals being handled at any given time. Although not shown for simplicity, each digital receiver module 222 may include one or more digital data receivers, a searcher receiver, and a diversity combiner and decoder circuit. The searcher receiver may be used to search for appropriate diversity modes of carrier signals, and may be used to search for pilot signals (or other relatively fixed pattern strong signals).

The digital transmitter modules 224 may process signals to be transmitted to UT 400 via satellite 300. Although not shown for simplicity, each digital transmitter module 224 may include a transmit modulator that modulates data for transmission. The transmission power of each transmit modulator may be controlled by a corresponding digital transmit power controller (not shown for simplicity) that may (1) apply a minimum level of power for purposes of interference reduction and resource allocation and (2) apply appropriate levels of power when needed to compensate for attenuation in the transmission path and other path transfer characteristics.

The control processor 228, which is coupled to digital receiver modules 222, digital transmitter modules 224, and baseband processor 226, may provide command and control signals to effect functions such as, but not limited to, signal processing, timing signal generation, power control, handoff control, diversity combining, and system interfacing.

The control processor 228 may also control the generation and power of pilot, synchronization, and paging channel signals and their coupling to the transmit power controller (not shown for simplicity). The pilot channel is a signal that is not modulated by data, and may use a repetitive unchanging pattern or non-varying frame structure type (pattern) or tone type input. For example, the orthogonal function used to form the channel for the pilot signal generally has a constant value, such as all 1's or 0's, or a well-known repetitive pattern, such as a structured pattern of interspersed 1's and 0's.

Baseband processor 226 is well known in the art and is therefore not described in detail herein. For example, the baseband processor 226 may include a variety of known elements such as (but not limited to) coders, data modems, and digital data switching and storage components.

The PSTN interface 230 may provide communication signals to, and receive communication signals from, an external PSTN either directly or through additional infrastructure 106, as illustrated in FIG. 1. The PSTN interface 230 is well known in the art, and therefore is not described in detail herein. For other implementations, the PSTN interface 230 may be omitted, or may be replaced with any other suitable interface that connects gateway 200 to a ground-based network (e.g., the Internet).

The LAN interface 240 may provide communication signals to, and receive communication signals from, an external LAN. For example, LAN interface 240 may be coupled to the internet 108 either directly or through additional infrastructure 106, as illustrated in FIG. 1. The LAN interface 240 is well known in the art, and therefore is not described in detail herein.

The gateway interface 245 may provide communication signals to, and receive communication signals from, one or more other gateways associated with the satellite communication system 100 of FIG. 1 (and/or to/from gateways associated with other satellite communication systems, not shown for simplicity). For some implementations, gateway interface 245 may communicate with other gateways via one or more dedicated communication lines or channels (not shown for simplicity). For other implementations, gateway interface 245 may communicate with other gateways using PSTN 110 and/or other networks such as the Internet 108 (see also FIG. 1). For at least one implementation, gateway interface 245 may communicate with other gateways via infrastructure 106.

Overall gateway control may be provided by gateway controller 250. The gateway controller 250 may plan and control utilization of satellite 300's resources by gateway 200. For example, the gateway controller 250 may analyze trends, generate traffic plans, allocate satellite resources, monitor (or track) satellite positions, and monitor the performance of gateway 200 and/or satellite 300. The gateway controller 250 may also be coupled to a ground-based satellite controller (not shown for simplicity) that maintains and monitors orbits of satellite 300, relays satellite usage information to gateway 200, tracks the positions of satellite 300, and/or adjusts various channel settings of satellite 300.

For the example implementation illustrated in FIG. 2, the gateway controller 250 includes a local time, frequency, and position references 251, which may provide local time and frequency information to the RF subsystem 210, the digital subsystem 220, and/or the interfaces 230, 240, and 245. The time and frequency information may be used to synchronize the various components of gateway 200 with each other and/or with satellite(s) 300. The local time, frequency, and position references 251 may also provide position information (e.g., ephemeris data) of satellite(s) 300 to the various components of gateway 200. Further, although depicted in FIG. 2 as included within gateway controller 250, for other implementations, the local time, frequency, and position references 251 may be a separate subsystem that is coupled to gateway controller 250 (and/or to one or more of digital subsystem 220 and RF subsystem 210).

Although not shown in FIG. 2 for simplicity, the gateway controller 250 may also be coupled to a network control center (NCC) and/or a satellite control center (SCC). For example, the gateway controller 250 may allow the SCC to communicate directly with satellite(s) 300, for example, to retrieve ephemeris data from satellite(s) 300. The gateway controller 250 may also receive processed information (e.g., from the SCC and/or the NCC) that allows gateway controller 250 to properly aim its antennas 205 (e.g., at the appropriate satellite(s) 300), to schedule beam transmissions, to coordinate handovers, and to perform various other well-known functions.

Gateway controller 250 may include or otherwise be associated with a UT resource allocator 252 that may allocate contention-based resources to one or more UTs and/or may control or assist with granting scheduled return link resources to the one or more UTs. More specifically, the UT resource allocator 252 may allocate contention-based resources to a plurality of UTs, for example, so that the UTs may transmit buffered data to gateway 200 via satellite 300 prior to a grant of scheduled return link resources to the UTs. The gateway 200 may receive a first portion of buffered data from a UT on the contention-based resources. In some aspects, reception of the data by the SAN on the contention-based resources may serve as an implicit scheduling request, from the UT, for a grant of scheduled return link resources. The gateway 200 may also receive a buffer status report (BSR) on the contention-based resources. In some aspects, the UT resource allocator 252 may suspend or terminate the allocation of contention-based resources after expiration of a time period. In other aspects, the UT resource allocator 252 may suspend or terminate the allocation of contention-based resources in response to the grant of scheduled return link resources to the UT.

For some implementations, the UT resource allocator 252 may also include a scheduler (not shown in FIG. 2 for simplicity) that schedules one or more grants of return link resources to the UTs. Upon receiving a grant of scheduled return link resources, a UT may transmit a second portion (e.g., a remaining portion) of the buffered data on the scheduled return link resources of the satellite system 100. After the allocation of contention-based resources is suspended or terminated, the UT resource allocator 252 may subsequently allocate contention-based resources to the UTs, for example, when the UTs receive additional data for transmission to the gateway 200 via satellite 300. For other implementations, the scheduler may be included in other suitable components of the gateway 200, and/or may be included within other suitable components of the SAN 150 (see also FIG. 1).

Figure 3:
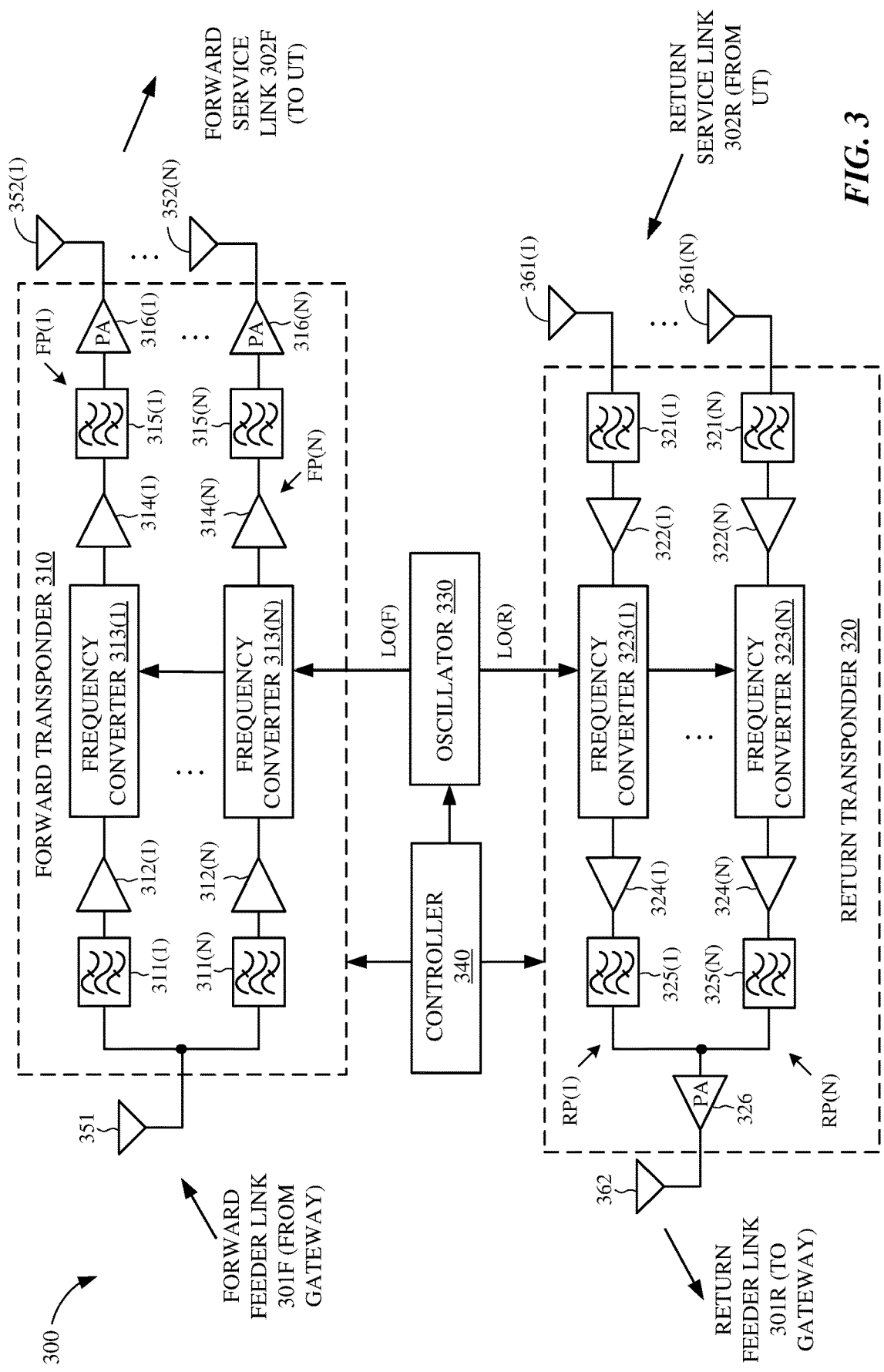
FIG. 3 shows a block diagram of one example of the satellite of FIG. 1.

FIG. 3 is an example block diagram of satellite 300 for illustrative purposes only. It will be appreciated that specific satellite configurations can vary significantly and may or may not include on-board processing. Further, although illustrated as a single satellite, two or more satellites using inter-satellite communication may provide the functional connection between the gateway 200 and UT 400. It will be appreciated that disclosure is not limited to any specific satellite configuration and any satellite or combinations of satellites that can provide the functional connection between the gateway 200 and UT 400 can be considered within the scope of the disclosure. In one example, satellite 300 is shown to include a forward transponder 310, a return transponder 320, an oscillator 330, a controller 340, forward link antennas 351-352, and return link antennas 361-362. The forward transponder 310, which may process communication signals within a corresponding channel or frequency band, may include a respective one of first bandpass filters 311(1)-311(N), a respective one of first LNAs 312(1)-312(N), a respective one of frequency converters 313(1)-313(N), a respective one of second LNAs 314(1)-314(N), a respective one of second bandpass filters 315(1)-315(N), and a respective one of PAs 316(1)-316(N). Each of the PAs 316(1)-316(N) is coupled to a respective one of antennas 352(1)-352(N), as shown in FIG. 3.

Within each of the respective forward paths FP(1)-FP(N), the first bandpass filter 311 passes signal components having frequencies within the channel or frequency band of the respective forward path FP, and filters signal components having frequencies outside the channel or frequency band of the respective forward path FP. Thus, the pass band of the first bandpass filter 311 corresponds to the width of the channel associated with the respective forward path FP. The first LNA 312 amplifies the received communication signals to a level suitable for processing by the frequency converter 313. The frequency converter 313 converts the frequency of the communication signals in the respective forward path FP (e.g., to a frequency suitable for transmission from satellite 300 to UT 400). The second LNA 314 amplifies the frequency-converted communication signals, and the second bandpass filter 315 filters signal components having frequencies outside of the associated channel width. The PA 316 amplifies the filtered signals to a power level suitable for transmission to UTs 400 via respective antenna 352. The return transponder 320, which includes a number N of return paths RP(1)-RP(N), receives communication signals from UT 400 along return service link 302R via antennas 361(1)-361(N), and transmits communication signals to gateway 200 along return feeder link 301R via one or more antennas 362. Each of the return paths RP(1)-RP(N), which may process communication signals within a corresponding channel or frequency band, may be coupled to a respective one of antennas 361(1)-361(N), and may include a respective one of first bandpass filters 321(1)-321(N), a respective one of first LNAs 322(1)-322(N), a respective one of frequency converters 323(1)-323(N), a respective one of second LNAs 324(1)-324(N), and a respective one of second bandpass filters 325(1)-325(N).

Within each of the respective return paths RP(1)-RP(N), the first bandpass filter 321 passes signal components having frequencies within the channel or frequency band of the respective return path RP, and filters signal components having frequencies outside the channel or frequency band of the respective return path RP. Thus, the pass band of the first bandpass filter 321 may for some implementations correspond to the width of the channel associated with the respective return path RP. The first LNA 322 amplifies all the received communication signals to a level suitable for processing by the frequency converter 323. The frequency converter 323 converts the frequency of the communication signals in the respective return path RP (e.g., to a frequency suitable for transmission from satellite 300 to gateway 200). The second LNA 324 amplifies the frequency-converted communication signals, and the second bandpass filter 325 filters signal components having frequencies outside of the associated channel width. Signals from the return paths RP(1)-RP(N) are combined and provided to the one or more antennas 362 via a PA 326. The PA 326 amplifies the combined signals for transmission to the gateway 200.

Oscillator 330, which may be any suitable circuit or device that generates an oscillating signal, provides a forward local oscillator signal LO(F) to the frequency converters 313(1)-313(N) of forward transponder 310, and provides a return local oscillator signal LO(R) to frequency converters 323(1)-323(N) of return transponder 320. For example, the LO(F) signal may be used by frequency converters 313(1)-313(N) to convert communication signals from a frequency band associated with the transmission of signals from gateway 200 to satellite 300 to a frequency band associated with the transmission of signals from satellite 300 to UT 400. The LO(R) signal may be used by frequency converters 323(1)-323(N) to convert communication signals from a frequency band associated with the transmission of signals from UT 400 to satellite 300 to a frequency band associated with the transmission of signals from satellite 300 to gateway 200.

Controller 340, which is coupled to forward transponder 310, return transponder 320, and oscillator 330, may control various operations of satellite 300 including (but not limited to) channel allocations. In one aspect, the controller 340 may include a memory coupled to a processor (not shown for simplicity). The memory may include a non-transitory computer-readable medium (e.g., one or more nonvolatile memory elements, such as EPROM, EEPROM, Flash memory, a hard drive, etc.) storing instructions that, when executed by the processor, cause the satellite 300 to perform operations including (but not limited to) those described herein with respect to FIGS. 12-15.

Figure 4:
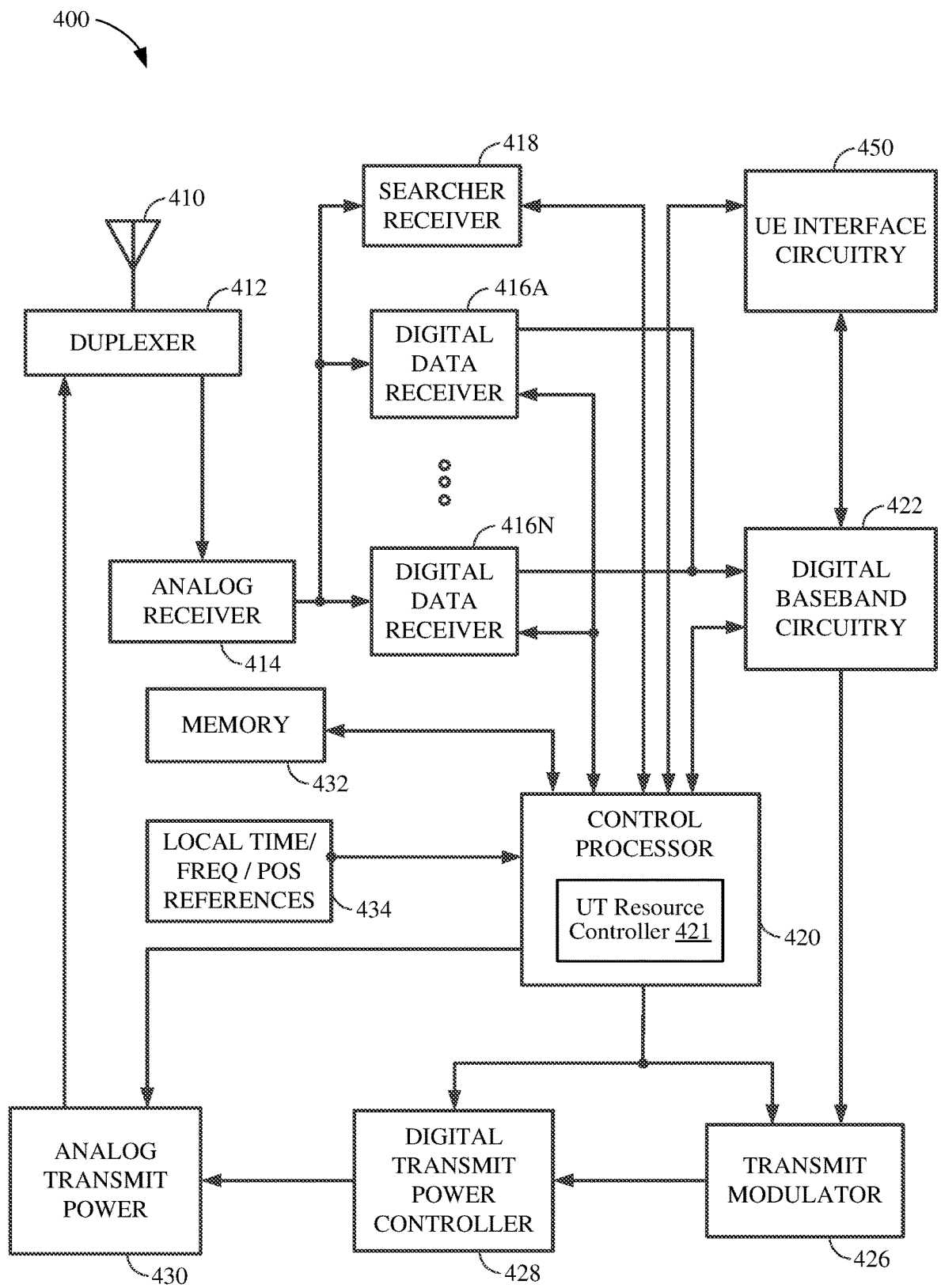
FIG. 4 shows a block diagram of one example of the user terminal (UT) of FIG. 1.

An example of a transceiver for use in the UT 400 or 401 is illustrated in FIG. 4. In FIG. 4, at least one antenna 410 is provided for receiving forward link communication signals (e.g., from satellite 300), which are transferred to an analog receiver 414, where they are down-converted, amplified, and digitized. A duplexer element 412 is often used to allow the same antenna to serve both transmit and receive functions. Alternatively, a UT transceiver may employ separate antennas for operating at different transmit and receive frequencies.

The digital communication signals output by the analog receiver 414 are transferred to at least one digital data receiver 416A and at least one searcher receiver 418. Additional digital data receivers to 416N can be used to obtain desired levels of signal diversity, depending on the acceptable level of transceiver complexity, as would be apparent to one skilled in the relevant art.

At least one user terminal control processor 420 is coupled to digital data receivers 416A-416N and searcher receiver 418. The control processor 420 provides, among other functions, basic signal processing, timing, power and handoff control or coordination, and selection of frequency used for signal carriers. Another basic control function that may be performed by the control processor 420 is the selection or manipulation of functions to be used for processing various signal waveforms. Signal processing by the control processor 420 can include a determination of relative signal strength and computation of various related signal parameters. Such computations of signal parameters, such as timing and frequency, may include the use of additional or separate dedicated circuitry to provide increased efficiency or speed in measurements or improved allocation of control processing resources.

The outputs of digital data receivers 416A-416N are coupled to digital baseband circuitry 422 within the user terminal. The digital baseband circuitry 422 comprises processing and presentation elements used to transfer information to and from UE 500 as shown in FIG. 1, for example. Referring to FIG. 4, if diversity signal processing is employed, the digital baseband circuitry 422 may comprise a diversity combiner and decoder. Some of these elements may also operate under the control of, or in communication with, a control processor 420.

When voice or other data is prepared as an output message or communications signal originating with the user terminal, the digital baseband circuitry 422 is used to receive, store, process, and otherwise prepare the desired data for transmission. The digital baseband circuitry 422 provides this data to a transmit modulator 426 operating under the control of the control processor 420. The output of the transmit modulator 426 is transferred to a power controller 428 which provides output power control to a transmit power amplifier 430 for final transmission of the output signal from the antenna 410 to a satellite (e.g., satellite 300).

In FIG. 4, the UT transceiver also includes a memory 432 associated with the control processor 420. The memory 432 may include instructions for execution by the control processor 420 as well as data for processing by the control processor 420.

In the example illustrated in FIG. 4, the UT 400 also includes an optional local time, frequency and/or position references 434 (e.g., a GPS receiver), which may provide local time, frequency and/or position information to the control processor 420 for various applications, including, for example, time and frequency synchronization for the UT 400.

Digital data receivers 416A-N and searcher receiver 418 are configured with signal correlation elements to demodulate and track specific signals. Searcher receiver 418 is used to search for pilot signals, or other relatively fixed pattern strong signals, while digital data receivers 416A-N are used to demodulate other signals associated with detected pilot signals. However, a digital data receiver 416 can be assigned to track the pilot signal after acquisition to accurately determine the ratio of signal chip energies to signal noise, and to formulate pilot signal strength. Therefore, the outputs of these units can be monitored to determine the energy in, or frequency of, the pilot signal or other signals. These receivers also employ frequency tracking elements that can be monitored to provide current frequency and timing information to control processor 420 for signals being demodulated.

The control processor 420 may use such information to determine to what extent the received signals are offset from the oscillator frequency, when scaled to the same frequency band, as appropriate. This and other information related to frequency errors and frequency shifts can be stored in a storage or memory element 432 as desired.

The control processor 420 may also be coupled to UE interface circuitry 450 to allow communications between UT 400 and one or more UEs. UE interface circuitry 450 may be configured as desired for communication with various UE configurations and accordingly may include various transceivers and related components depending on the various communication technologies employed to communicate with the various UEs supported. For example, UE interface circuitry 450 may include one or more antennas, a wide area network (WAN) transceiver, a wireless local area network (WLAN) transceiver, a Local Area Network (LAN) interface, a Public Switched Telephone Network (PSTN) interface and/or other known communication technologies configured to communicate with one or more UEs in communication with UT 400.

As described above with respect to FIG. 1, the UT resource controller 421 may allow the UT 400 to transmit buffered data to a gateway via a satellite using contention-based resources of the satellite system 100 during a time period prior to receiving a grant for scheduled RL resources. The UT resource controller 421 may also allow the UT 400 to transmit a buffer status report on the contention-based resources during the time period. For some implementations, the UT resource controller 421 may cause the UT 400 to terminate data transmissions on the contention-based resources (e.g., after expiration of the time period or upon the grant of scheduled RL resources to the UT). Upon receiving the grant of the scheduled RL resources, the UT resource controller 421 may allow the UT 400 to transmit additional portions of the buffered data to the gateway 200 or 201, via satellite 300, on the scheduled RL resources granted by the SAN 150. In some aspects, the UT resource controller 421 may be included within or associated with control processor 420, for example, as depicted in FIG. 4. In other aspects, the UT resource controller 421 may be included within or associated with any other suitable component of the UT 400.

Figure 5:
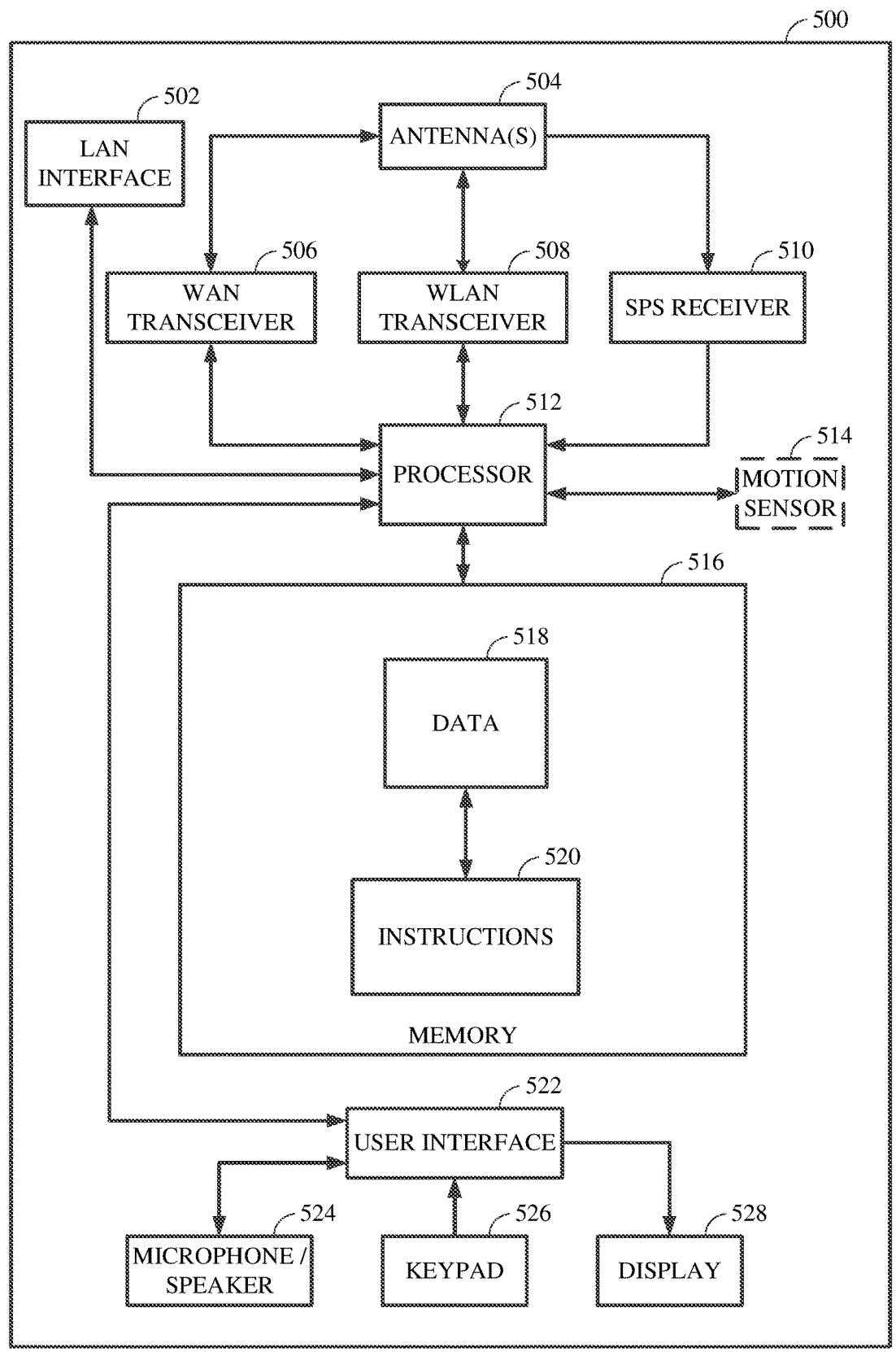
FIG. 5 shows a block diagram of one example of the user equipment (UE) of FIG. 1.

FIG. 5 is a block diagram illustrating an example of UE 500, which also can apply to UE 501 of FIG. 1. The UE 500 as shown in FIG. 5 may be a mobile device, a handheld computer, a tablet, a wearable device, a smart watch, or any type of device capable of interacting with a user, for example. Additionally, the UE may be a network side device that provides connectivity to various ultimate end user devices and/or to various public or private networks. In the example shown in FIG. 5, the UE 500 may comprise a LAN interface 502, one or more antennas 504, a wide area network (WAN) transceiver 506, a wireless local area network (WLAN) transceiver 508, and a satellite positioning system (SPS) receiver 510. The SPS receiver 510 may be compatible with the Global Positioning System (GPS), GLONASS and/or any other global or regional satellite based positioning system. In an alternate aspect, the UE 500 may include a WLAN transceiver 508, such as a Wi-Fi transceiver, with or without the LAN interface 502, WAN transceiver 506, and/or SPS receiver 510, for example. Further, UE 500 may include additional transceivers such as Bluetooth, ZigBee and other known technologies, with or without the LAN interface 502, WAN transceiver 506, WLAN transceiver 508 and/or SPS receiver 510. Accordingly, the elements illustrated for UE 500 are provided merely as an example configuration and are not intended to limit the configuration of UEs in accordance with the various aspects disclosed herein.

In the example shown in FIG. 5, a processor 512 is connected to the LAN interface 502, the WAN transceiver 506, the WLAN transceiver 508 and the SPS receiver 510. Optionally, a motion sensor 514 and other sensors may also be coupled to the processor 512.

A memory 516 is connected to the processor 512. In one aspect, the memory 516 may include data 518 which may be transmitted to and/or received from the UT 400, as shown in FIG. 1. Referring to FIG. 5, the memory 516 may also include stored instructions 520 to be executed by the processor 512 to perform the process steps for communicating with the UT 400, for example. Furthermore, the UE 500 may also include a user interface 522, which may include hardware and software for interfacing inputs or outputs of the processor 512 with the user through light, sound or tactile inputs or outputs, for example. In the example shown in FIG. 5, the UE 500 includes a microphone/speaker 524, a keypad 526, and a display 528 connected to the user interface 522. Alternatively, the user's tactile input or output may be integrated with the display 528 by using a touch-screen display, for example. Once again, the elements illustrated in FIG. 5 are not intended to limit the configuration of the UEs disclosed herein and it will be appreciated that the elements included in the UE 500 will vary based on the end use of the device and the design choices of the system engineers.

Additionally, the UE 500 may be a user device such as a mobile device or external network side device in communication with but separate from the UT 400 as illustrated in FIG. 1, for example. Alternatively, the UE 500 and the UT 400 may be integral parts of a single physical device.

As mentioned above, GSO satellites are deployed in geostationary orbits at approximately 35,000 km above the Earth's surface, and revolve around the Earth in an equatorial orbit at the Earth's own angular velocity. In contrast, NGSO satellites are deployed in non-geostationary orbits and revolve around the Earth above various paths of the Earth's surface at relatively low altitudes (e.g., as compared with GSO satellites).

Figure 6:
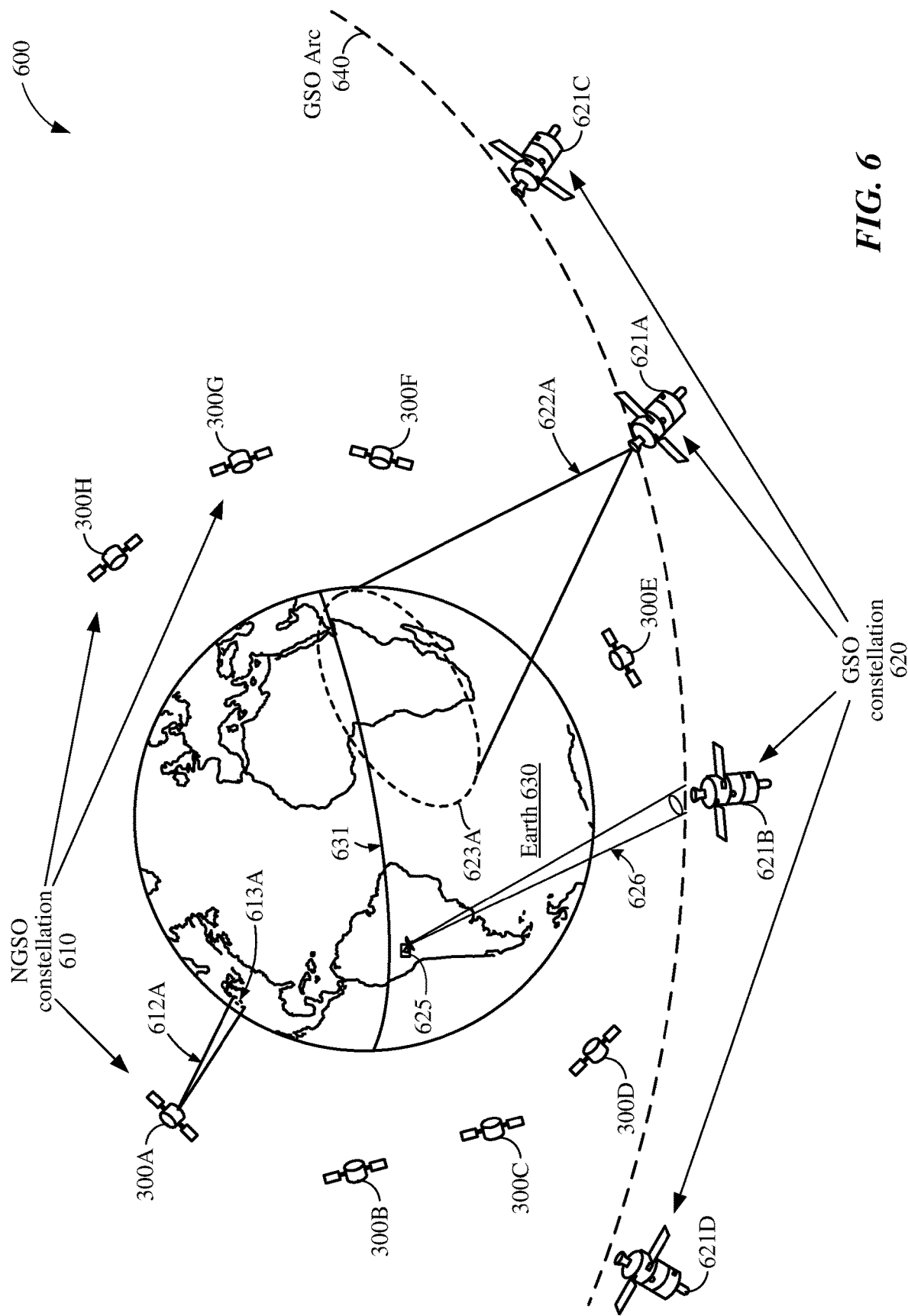
FIG. 6 shows a diagram depicting an NGSO satellite constellation and a GSO satellite constellation orbiting the earth.

For example, FIG. 6 shows a diagram 600 depicting a first constellation 610 of NGSO satellites 300A-300H and a second constellation 620 of GSO satellites 621A-621D in orbit around Earth 630. Although depicted in FIG. 6 as including only eight NGSO satellites 300A-300H, the first constellation 610 may include any suitable number of NGSO satellites, for example, to provide world-wide satellite coverage. For some implementations, the first constellation 610 may include between 600 and 900 NGSO satellites. Similarly, although depicted in FIG. 6 as including only four GSO satellites 621A-621D, the second constellation 620 may include any suitable number of GSO satellites, for example, to provide world-wide satellite coverage. In addition, although not shown in FIG. 6 for simplicity, one or more other constellations of GSO satellites and/or one or more other constellations of NGSO satellites may be in orbit above Earth 630.

The first constellation 610, which may hereinafter be referred to as the NGSO satellite constellation 610, may provide a first satellite service to most, if not all, areas on Earth 630. The second constellation 620, which may hereinafter be referred to as the GSO satellite constellation 620, may provide a second satellite service to large portions of Earth 630. The first satellite service may be different than the second satellite service. For some aspects, the first satellite service provided by the NGSO satellite constellation 610 may correspond to a global broadband Internet service, and the second satellite service provided by the GSO satellite constellation 620 may correspond to a satellite-based broadcast (e.g., television) service. Further, for at least some implementations, each of NGSO satellites 300A-300H may be one example of satellite 300 of FIGS. 1 and 3.

The NGSO satellites 300A-300H may orbit the Earth 630 in any suitable number of non-geosynchronous orbital planes (not shown for simplicity), and each of the orbital planes may include a plurality of NGSO satellites (e.g., such as one or more of the NGSO satellites 300A-300H). The non-geosynchronous orbital planes may include, for example, polar orbital patterns and/or Walker orbital patterns. Thus, to a stationary observer on Earth 630, the NGSO satellites 300A-300H appear to move quickly across the sky in a plurality of different paths across the Earth's surface, with each of the NGSO satellites 300A-300H providing coverage for a corresponding path across the earth's surface.

In contrast, the GSO satellites 621A-621D may be in a geosynchronous orbit around Earth 630 and thus, to a stationary observer on Earth 630, may appear motionless in a fixed position in the sky located above the Earth's equator 631. Each of the GSO satellites 621A-621D maintains a relatively fixed line-of-sight with a corresponding GSO ground station on Earth 630. For example, GSO satellite 621B is depicted in FIG. 6 as maintaining a relatively fixed line-of-sight with a GSO ground station 625. It is noted that for a given point on the surface of Earth 630, there may be an arc of positions in the sky along which the GSO satellites 621A-621D may be located. This arc of GSO satellite positions may be referred to herein as the GSO arc 640. The receiving area for a GSO ground station (e.g., such as GSO ground station 625) may be defined by an antenna pattern of typically fixed orientation and fixed beam width (such as a beam width defined by an ITU specification). For example, the GSO ground station 625 is depicted as transmitting a beam 626 towards GSO satellite 621B.

In some aspects, each of the NGSO satellites 300A-300H may include a number of directional antennas to provide high-speed forward links (e.g., downlinks) with user terminals such as UT 400 of FIG. 1 and/or with gateways such as gateway 200 of FIG. 1. A high-gain directional antenna achieves higher data rates and is less susceptible to interference than an omni-directional antenna by focusing radiation into a relatively narrow beam width (as compared to the relatively wide beam width associated with an omni-directional antenna). For example, as depicted in FIG. 6, the coverage area 613A provided by a beam 612A transmitted from NGSO satellite 300A is relatively small compared to the coverage area 623A provided by a beam 622A transmitted from GSO satellite 621A.

Because the NGSO satellites 300A-300H revolve around the earth 630 relatively quickly (e.g., approximately every 90 minutes for low-earth-orbit (LEO) satellites), their positions change quickly relative to a fixed location on earth 630. To provide coverage over a wide area of the earth's surface (e.g., to provide Internet services across the United States), each of the NGSO satellites 300A-300H may provide coverage for a corresponding path across the earth's surface. For example, the NGSO satellites 300A-300H may each transmit any number of beams, and one or more of the beams may be directed towards overlapping regions on the earth's surface. As used herein, the footprint of a satellite is the surface area (on Earth) within which all UTs can communicate with the satellite (above a minimum elevation angle). The area covered by a beam transmitted (e.g., from a corresponding antenna) of the satellite is referred to herein as the beam coverage area. Thus, the footprint of a satellite may be defined by a number of beam coverage areas provided by a number of beams transmitted from the satellite.

Figure 7:
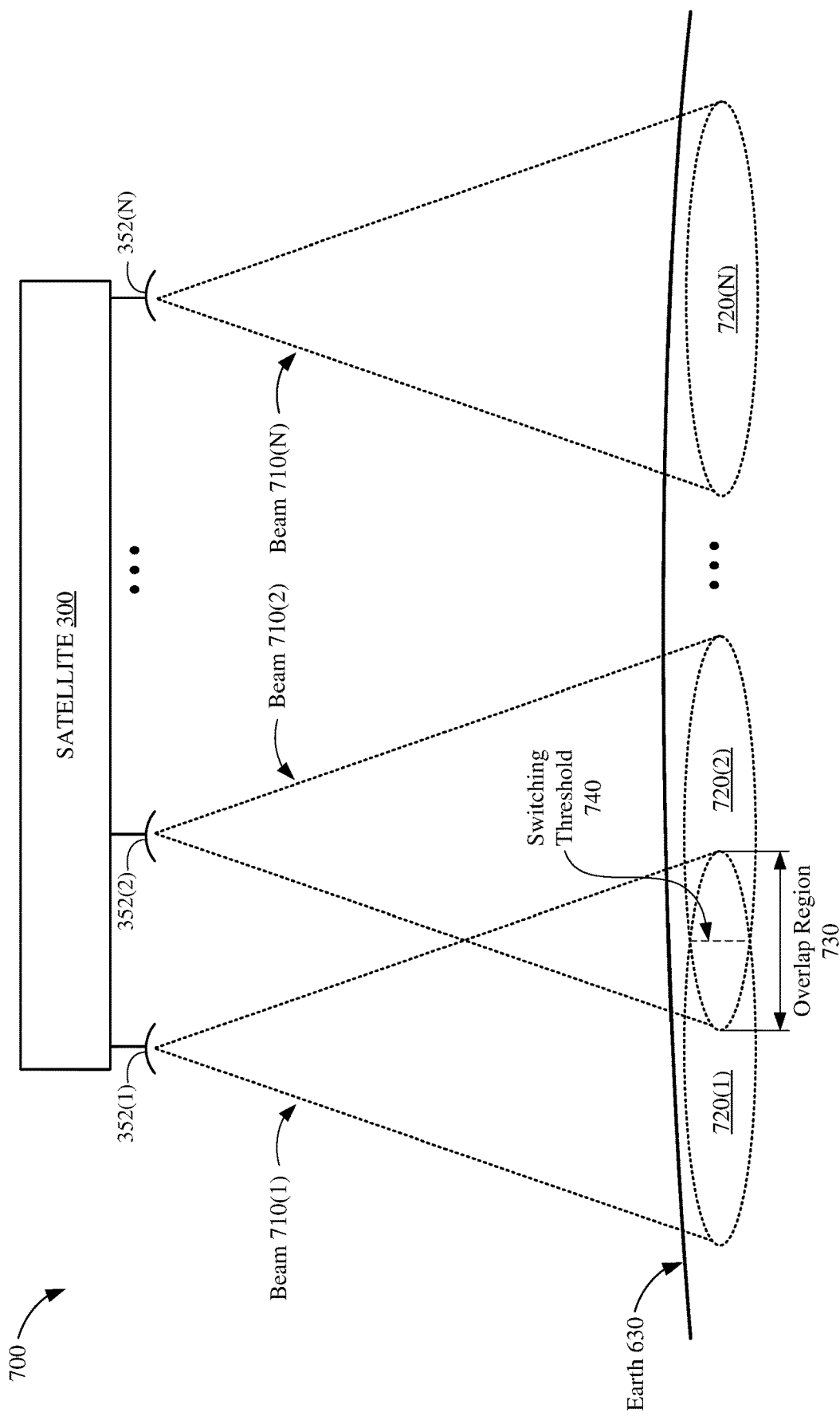
FIG. 7 depicts an NGSO satellite transmitting a number of beams onto the surface of the Earth.

FIG. 7 shows a diagram 700 depicting satellite 300 transmitting a number (N) of beams 710(1)-710(N) from a respective number (N) of antennas 352(1)-352(N). Referring also to FIG. 3, each of the antennas 352(1)-352(N) may be coupled to a corresponding forward path (FP) in the forward transponder 310 of satellite 300. Each of the beams 710(1)-710(N) may be used to transmit data from satellite 300 to one or more user terminals (e.g., UT 400 of FIG. 4) that are located within the beam's coverage area on Earth. Thus, in some aspects, the beams 710(1)-710(N) may represent the forward service link between satellite 300 and a number of UTs 400. For the example diagram 700 of FIG. 7, the beams 710(1)-710(N) are depicted as providing coverage areas 720(1)-720(N), respectively, on Earth 630. Together, the coverage areas 720(1)-720(N) provided by respective beams 710(1)-710(N) may define the footprint of satellite 300.

Each of the coverage areas 720(1)-720(N) may extend across an entire width of the satellite's footprint. In some implementations, the coverage areas 720(1)-720(N) may be of other suitable shapes, sizes, and/or orientations. Further, for at least some implementations, all satellites 300 in the NGSO satellite constellation 610 may have substantially similar footprints. Each of the beams 710(1)-710(N) operates as a respective communications channel of the satellite 300. As the satellite 300 passes over a user terminal on the surface of the earth 630, the channel quality of a given beam (e.g., as measured by the user terminal) may deteriorate, whereas the channel quality of a different beam may improve. Thus, it may be necessary to periodically switch the communications channel for the user terminal from one beam to another. This process may be referred to herein as "inter-beam handover."

Adjacent pairs of the coverage areas 720(1)-720(N) may touch and/or overlap each other, for example, so that the footprint provided by the beams 710(1)-710(N) may have minimal coverage gaps. In the example of FIG. 7, the intersection of beams 710(1) and 710(2) form an overlap region 730. Based on the movements of the satellite 300, a user terminal lying exclusively within coverage area 720(1) (e.g., and outside the overlap region 730) at a first time may eventually fall within the overlap region 730 at a second time. When the user terminal is within the overlap region 730, it may be able to communicate with satellite 300 using beam 710(1) or beam 710(2). At a certain point in the satellite's orbit, the channel quality of beam 710(2) will exceed the channel quality of beam 710(1), thus prompting an inter-beam handover from the current beam 710(1) (e.g., the "source beam") to the new beam 710(2) (e.g., the "target beam"). For example, the inter-beam handover may be triggered when the user terminal crosses a switching threshold 740 (e.g., such that the user terminal is subsequently more prominently positioned within the coverage area 720 (2) of the target beam 710(2) than the coverage area 720(1) of the source beam 710(1)).

The satellite 300 may be controlled by a network controller (e.g., SAN 150 of FIG. 1) on the surface of the earth 630. More specifically, each beam 710(1)-710(N) may be managed and/or controlled by a respective scheduler provided within, or otherwise associated with, the network controller. During an inter-beam handover, the scheduler for the source beam hands off communications with the user terminal to the scheduler for the target beam. The network controller and the user terminal may perform this operation synchronously, for example, based on a timeline specified in a beam transition table.

Referring also to FIG. 1, propagation delays associated with transmitting signals from UT 400 to SAN 150 via satellite 300 (e.g., on the return link) may be on the order of 20 milliseconds (ms), and propagation delays associated with transmitting signals from SAN 150 to UT 400 via satellite 300 (e.g., on the forward link) may be on the order of 20 ms. Thus, for one example implementation of satellite system 100, the round trip time (RTT) of a signal exchange between UT 400 and SAN 150 via satellite 300 may be approximately 40 ms. In addition, the UT 400 and SAN 150 may have combined processing delays (e.g., turn-around times) of approximately 6 ms, and the scheduler within or associated with SAN 150 may also have processing delays of a few milliseconds. Thus, there may be a delay of approximately 47 ms (or more) between the time that the UT 400 transmits a signal to SAN 150 via satellite 300 and the time that the UT 400 receives a response from the SAN 150 via satellite 300. This delay may hereinafter be referred to as an "RTT delay."

When the UT 400 receives data for transmission to gateway 200 (e.g., from one or more UEs 500 associated with UT 400), the UT 400 may store the data in a transmit buffer until return link resources are available for transmitting the data to gateway 200 via satellite 300. In some aspects, when data is stored in the transmit buffer of UT 400, a scheduling request (SR) and/or a buffer status report (BSR) may be triggered. The UT 400 may transmit scheduling requests during SR opportunities, which may occur at regular intervals. For example, for implementations in which SR opportunities occur every 40 ms, the UT 400 may be delayed in transmitting the scheduling request by as much as 40 ms after the scheduling request is triggered. This delay may hereinafter be referred to as an "SR opportunity delay." When the next SR opportunity occurs, the UT 400 may transmit a scheduling request to the SAN 150. In response thereto, the SAN 150 may grant dynamically scheduled return link resources to the UT 400, for example, by transmitting a scheduling grant to the UT 400. Upon receipt of the scheduling grant, the UT 400 may transmit the buffered data using the return link resources granted by the SAN 150.

Figure 8A:
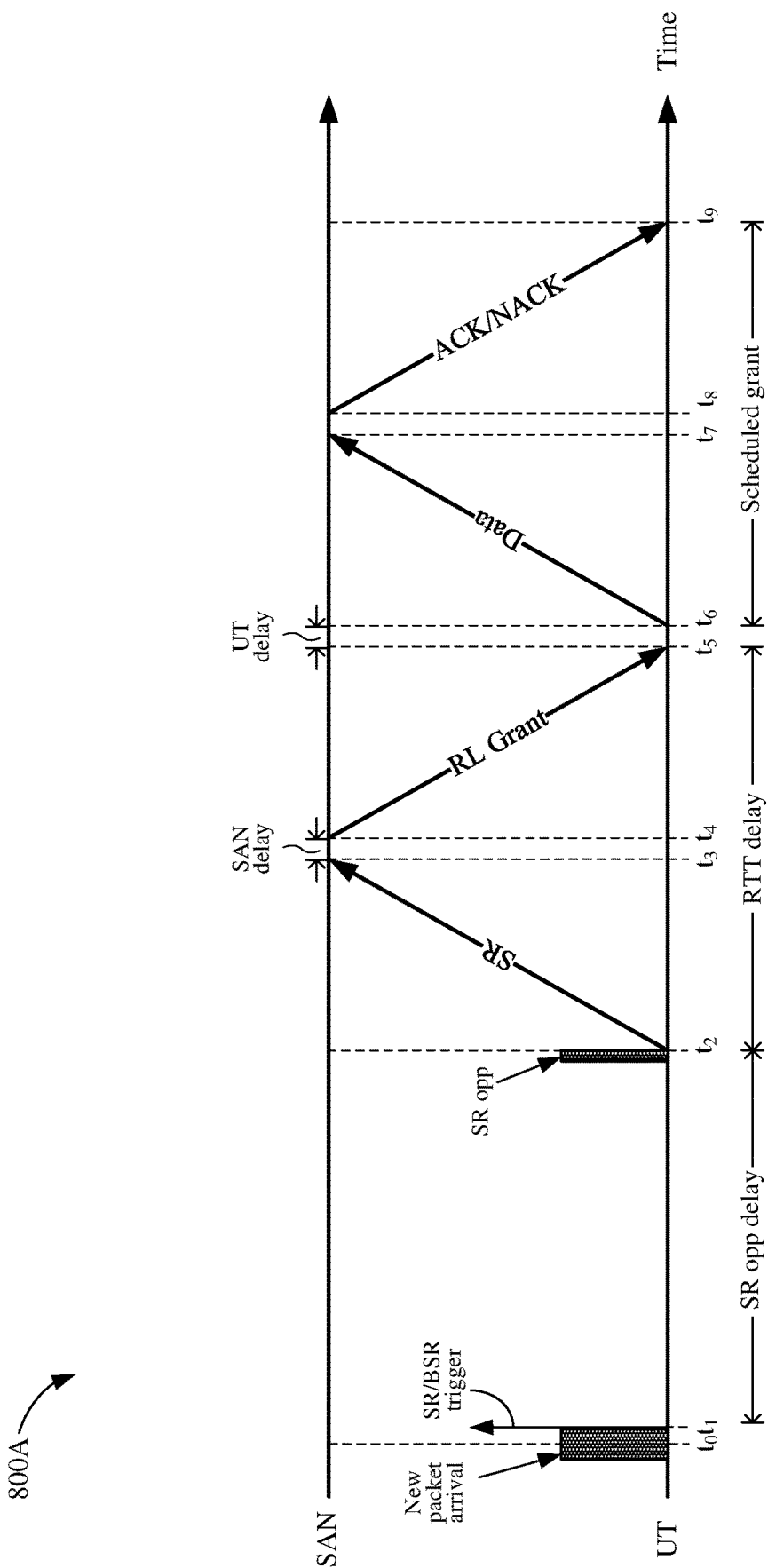
FIG. 8A shows a timing diagram depicting an example operation for transmitting data from a UT to a network controller via a satellite using return link resources granted by the network controller.

For example, FIG. 8A shows a timing diagram depicting an example operation 800A for transmitting data from a UT to a network controller via a satellite using return link resources granted by the network controller. For purposes of discussion herein, the network controller may correspond to SAN 150 of FIG. 1, and the user terminal (UT) may correspond to UT 400 of FIG. 4. At time $t_0$, data (e.g., a number of new packets) arrives at the UT. The data, which may be received from a number of UEs 500 associated with the UT, may be stored in a transmit buffer of the UT. In some aspects, storing the data in the transmit buffer of the UT may trigger a scheduling request and/or a BSR at time $t_1$. For the example of FIG. 8A, the next SR opportunity is not until time $t_2$, and thus the UT may not transmit a scheduling request to the SAN until time $t_2$. The time period between times $t_1$ and $t_2$ is denoted in FIG. 8A as the SR opportunity delay.

At time $t_2$, a SR opportunity occurs, and the UT transmits a scheduling request to the SAN. The scheduling request may be used by the UT to request a grant of dynamically scheduled return link resources of the satellite system 100. As mentioned above, this may occur when the UT has buffered data ready for transmission but does not have a resource grant for use of a physical return-link shared channel (PRSCH) of the satellite system 100. In some aspects, the scheduling request may be transmitted on a physical return-link control channel (PRCCH) of the satellite system 100.

At time $t_3$, the SAN receives the scheduling request, and after a processing delay, transmits a grant for return link resources (RL grant) to the UT at time $t_4$. The UT receives the RL grant at time $t_5$, and after a processing delay, begins transmitting the buffered data to the SAN via satellite 300 on the granted resources of the PRSCH at time $t_6$.

The SAN may receive the transmitted data at time $t_7$, and after a processing delay, may transmit either an acknowledgement (ACK) or a negative acknowledgement (NACK) to the UT at time $t_8$. An ACK may indicate that the SAN received and decoded the transmitted data, while a NACK may indicate that the SAN did not receive or decode all of the transmitted data. The UT may receive the ACK/NACK at time $t_9$.

As depicted in the example of FIG. 8A, the total delay between the time that the UT receives the transmit data (time $t_0$) and the time that the UT transmits the data to the SAN on the granted return link resources (time $t_6$) may be the sum of the SR opportunity delay and the RTT delay. For implementations in which the maximum SR opportunity delay is approximately 40 ms and the RTT delay is approximately 47 ms, the total UT transmission delay may be approximately 97 ms (or more).

Because humans may perceive propagation delays of approximately 100 ms, UT transmission delays of approximately 97 ms (or more) may result in unacceptable user experience, for example, when the transmit data is real-time data such as voice or video data. Thus, there is a need to reduce the UT transmission delays associated with satellite system 100.

As described in more detail below, the example implementations may reduce UT transmission delays by allowing a UT to transmit buffered data on contention-based resources of satellite system 100 while the UT waits for a scheduled grant of return link resources (e.g., PRSCH resources) from the SAN. In this manner, the UT may begin to transmit buffered data to the SAN via satellite 300 prior to receiving a RL grant from the SAN, which in turn may significantly reduce the UT transmission delays described above with respect to FIG. 8A (and thereby improve user experience).

Figure 8B:
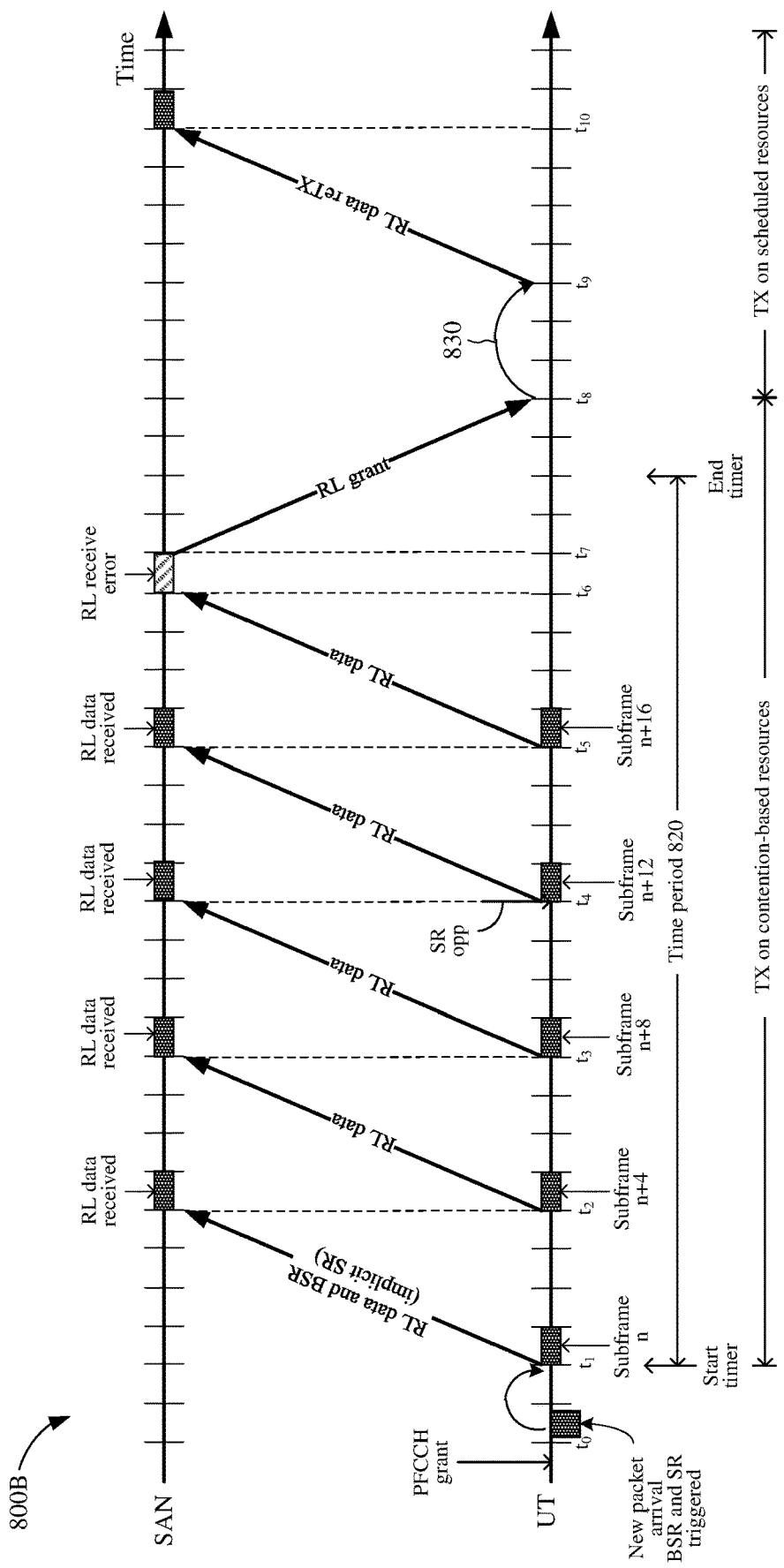
FIG. 8B shows a timing diagram depicting an example operation for transmitting data from a UT to a network controller via a satellite using contention-based resources and return link resources granted by the network controller.

FIG. 8B shows a timing diagram depicting an example operation 800B for transmitting data from a UT to a network controller in accordance with example implementations. For purposes of discussion herein, the network controller may correspond to SAN 150 of FIG. 1, and the user terminal (UT) may correspond to UT 400 of FIG. 4. At time $t_0$, data (e.g., a number of new packets) arrives at the UT. The data, which may be received from a number of UEs 500 associated with the UT, may be stored in a transmit buffer of the UT. In some aspects, storing the data in the transmit buffer of the UT may trigger the generation of a buffer status report (BSR) and/or may trigger the generation of a scheduling request (SR). For the example of FIG. 8B, the next SR opportunity is not until time $t_4$, and thus the UT may not transmit a scheduling request on the PRCCH to the SAN until time $t_4$ (although for other implementations, the SR opportunity may occur at times other than as depicted in FIG. 8B).

In accordance with example implementations, the SAN may allocate contention-based resources to the UT, for example, so that the UT may begin transmitting return link data on the contention-based resources to the SAN via the satellite 300 prior to receiving a grant for scheduled return link resources of the satellite system. For some implementations, a radio controller circuit (RRC) included within or associated with the SAN may allocate the number and/or size of resource blocks available to the UT as part of the contention-based resources, and may select the modulation and coding scheme (MCS) to be used by the UT when transmitting data on the contention-based resources. In some aspects, the SAN may activate the contention-based resources allocated to the UT by transmitting a grant of the contention-based resources to the UT using a physical-forward link control channel (PFCCH). The PFCCH may be independent of the contention-based resources (e.g., the PFCCH may include resource blocks different in time, frequency, and/or size than resource blocks associated with the contention-based resources). In some aspects, the PFCCH grant may identify the size and location of allocated resource block(s) of the contention-based resources, the MCS of the allocated resource block(s) of the contention-based resources, and/or a time period during which the UT may use the contention-based resources for RL data transmissions. In other aspects, signals transmitted on the PFCCH may also indicate the availability of a dedicated physical return link control channel (PRCCH), for example, upon which the UT may periodically transmit control information to the SAN via satellite 300 using resource blocks independent of the resource blocks associated with the contention-based resources.

Thus, for at least some implementations disclosed herein, the SAN may configure the contention-based resources for each UT in the terrestrial portion of the satellite system. For one example, the SAN may allocate one or more specific resource blocks to each UT (or to each group of UTs) and/or may indicate a number of time intervals during which the UT (or group of UTs) may use the allocated resource blocks of the contention-based resources. For another example, when the resource blocks associated with the contention-based resources are shared between a number (N) of groups of UTs, each group of UTs may share every $N^{th}$ subframe of the contention-based resources for data transmissions to the SAN via the satellite. In some aspects, the SAN may indicate the sub-frames upon which the UT (or group of UTs) may transmit data using the contention-based resources.

For some implementations, once the contention-based resources allocated to the UT have been activated by the SAN (e.g., based on an activation signal transmitted to the UT on the PFCCH), the UT may begin transmitting data on the allocated resource block(s) of the contention-based resources based on an "on-trigger." For example, if data queued in the UT triggers generation of a buffer status report (BSR) and the UT has not received a grant for scheduled return link resources of the satellite system, then the UT may begin transmitting the queued data using the allocated resource block(s) of the contention-based resources. Thus, in some aspects, triggering the generation of the BSR may operate as the "on-trigger" for contention-based resources allocated to the UT and activated by the SAN. Conversely, if scheduled RL resources are available to the UT when the BSR is triggered (e.g., the UT has received a grant for PRSCH resources), then the UT may transmit buffered data using the scheduled RL resources. In this case, the BSR may not operate as the on-trigger for the contention-based resources.

Thus, in contrast to the example operation 800A of FIG. 8A, the example operation 800B of FIG. 8B may allow the UT to begin transmitting data to the SAN via satellite 300 on the contention-based resources without receiving an explicit grant message, from the SAN, that grants scheduled return link resources to the UT. In addition, the UT may transmit the BSR to the SAN using the contention-based resources, for example, as depicted in FIG. 8B. In some aspects, the SAN may allocate one or more first resource blocks of the contention-based resources to the UT (or to a group of UTs that includes the UT of FIG. 8B) for transmitting buffered data to the SAN via the satellite, and may allocate one or more second resource blocks of the contention-based resources to another UT (or to another group of UTs) for transmitting the BSR to the SAN via the satellite. The one or more first resource blocks of the contention-based resources may be orthogonal to the one or more second resource blocks of the contention-based resources, for example, so that one group of UTs may transmit data using the first resource blocks of the contention-based resources while another group of UTs concurrently transmits data using the second resource blocks of the contention-based resources.

As shown in FIG. 8B, the SAN may activate the contention-based resources by transmitting a grant on the PFCCH prior to time $t_0$. As discussed above, the PFCCH grant may configure the size, location, and MCS of resource blocks allocated to the UT, and may indicate a number of transmit occasions or opportunities during which the UT may transmit RL data on the contention-based resources. For the example of FIG. 8B, the PFCCH grant allocates every fourth subframe to the UT for transmitting RL data to the satellite (e.g., subframe n, subframe n+4, subframe n+8, subframe n+12, and subframe n+16). For other implementations, the PFCCH grant may allocate different numbers of subframes to the UT and/or configure different intervals between the subframes allocated to the UT (e.g., by allocating every eight subframe to the UT, by allocating every tenth subframe to the UT, and so on). In some aspects, the SAN may release or de-activate the contention-based resources by transmitting a release signal to the UT on the PFCCH (not shown for simplicity).

As mentioned above, the arrival of new data packets at the UT may trigger the generation of the BSR. For the example of FIG. 8B, the BSR may be triggered for transmission to the satellite at time $t_1$, which corresponds to the first subframe (subframe n) allocated to the UT. Specifically, at time $t_1$, the UT may begin transmitting a first portion of the buffered data (e.g., a first subset of the first portion of the buffered data) and the BSR to the SAN via satellite 300 on subframe n of the contention-based resources of the satellite system 100. In some aspects, the UT may start the contention-based resource timer based on the first subframe of the contention-based resources allocated to the UT for RL data transmissions at time $t_1$, as depicted in the example of FIG. 8B. In other aspects, the UT may start the contention-based resource timer in response to the triggering or the generation of the BSR (e.g., just after time $t_0$). The contention-based resource timer may be used to define a time period 820 during which the UT may transmit RL data on the contention-based resources of the satellite system.

At time $t_2$, the SAN may receive the RL data and the BSR in subframe n transmitted from the UT. In some aspects, reception of the RL data and/or the BSR may operate as an implicit scheduling request (SR) informing the SAN that the UT has buffered data for transmission to the SAN. In this manner, the UT may not need to transmit a separate SR to the SAN. In response to the implicit SR, the SAN may schedule a grant of RL resources of the satellite system to the UT.

The UT may continue transmitting subsets of the first portion of the buffered data to the SAN during subsequent transmit opportunities indicated by the PFCCH grant. More specifically, for the example depicted in FIG. 8B, the UT may transmit a second subset of the first data portion in a second subframe (subframe n+4) at time $t_2$, may transmit a third subset of the first data portion in a third subframe (subframe n+8) at time $t_3$, may transmit a fourth subset of the first data portion in a fourth subframe (subframe n+12) at time $t_4$, and may transmit a fifth subset of the first data portion in a fifth subframe (subframe n+16) at time $t_5$. This process may continue until either the contention-based resource timer expires or the UT receives a grant of scheduled return link resources from the SAN (e.g., where the UT may transmit an $m^{th}$ subset of the first data portion in an $m^{th}$ subframe at time $t_{am}$, where "m" is an integer greater than or equal to 1).

The SAN may receive the second subset of the first data portion in subframe n+4 at time $t_3$, may receive the third subset of the first data portion in subframe n+8 at time $t_4$, may receive the fourth subset of the first data portion in subframe n+12 at time $t_5$, and may receive the fifth subset of the first data portion in subframe n+16 at time $t_6$. As depicted in FIG. 8B, the RL data transmitted by the UT in subframe n, subframe n+4, subframe n+8, and subframe n+12 is properly received by the SAN. However, the RL data transmitted by the UT in subframe n+16 is received in error by the SAN, for example, due to collisions on the contention-based resources. In response thereto, the SAN may identify which of the UTs transmitted the RL data in subframe n+16, and may instruct the identified UT to re-transmit the RL data, as described in more detail below.

Although not shown in FIG. 8B for simplicity, the UT may transmit the SR to the SAN during the time period 820 using the PRCCH (or another dedicated channel) of the scheduled RL resources. For some implementations, the dedicated resources (e.g., the PRCCH) upon which the SR and other control information may be transmitted by the UT may occur with a periodicity selected, for example, by the SAN. The dedicated resources may be scheduled to occur during selected intervals of the time period 820, while all other (e.g., non-selected) intervals of the time period 820 may be used for data transmissions on the contention-based resources. In some aspects, the PRCCH may be allocated to (or scheduled for) the UT between selected pairs of subframes of the contention-based resources. For some implementations, UT transmissions on the contention-based resources may be paused or suspended during selected intervals for which dedicated RL resources are granted to the UT (e.g., to transmit control information to the SAN).

For some implementations, the contention-based resources may be semi-statically configured by the SAN and allocated to a group of UTs for an adjustable period of time. In contrast to the dynamically scheduled RL grants depicted in FIG. 8A, use of the contention-based resources may avoid the need for specific RL grant messages over the PFCCH of the satellite system 100 for each subframe, thereby not only reducing overhead on the PFCCH but also allowing the UT more immediate access to return link resources of satellite system 100. It is noted that the scheduling request and grant messages associated with dynamically scheduled resources (e.g., as described above with respect to FIG. 8A) are not needed to activate the contention-based resources upon which the UT may transmit buffered data. Instead, the contention-based resources may be activated by a single grant (e.g., on the PFCCH) by the SAN, as described above.

At time $t_7$, which for the example of FIG. 8B occurs after the SR opportunity, the SAN transmits a RL grant to the UT. In some aspects, the amount of RL resources granted by the SAN may be based on the BSR previously received from the UT on the contention-based resources. In other aspects, the amount of RL resources granted by the SAN via the RL grant may be based, at least in part, on the amount of data received from the UT on the contention-based resources. In this manner, the allocation of scheduled RL resources may be selectively adjusted by the SAN to account for data transmissions during time period 820 on the contention-based resources. The UT receives the RL grant at time $t_8$, and after a processing delay indicated by arrow 830, may begin transmitting a second portion (e.g., a remaining portion) of the buffered data to the SAN (via satellite 300) on the granted RL resources (e.g., on the PRSCH) at time $t_9$. For the example of FIG. 8B, the RL grant may include a request to re-transmit, using the scheduled RL resources, the data received in error by the SAN at time $t_6$.

In some implementations, reception of the RL grant by the UT may de-activate, suspend, or terminate the allocation of contention-based resources to the UT, regardless of whether the time period 820 has expired. More specifically, the UT may, upon receiving the RL grant at time $t_8$, prevent additional data transmissions on the contention-based resources until a next BSR is triggered (e.g., in response to new packets arriving at the UT). Thus, in at least some implementations, allocation of the contention-based resources to the UT may be suspended or terminated when the UT receives a grant for scheduled RL resources of the satellite system. In this manner, reception of the RL grant by the UT may operate as an "off-trigger" that suspends or terminates the allocation of contention-based resources to the UT.

The SAN may receive the RL data transmitted by the UT on the PRSCH at time $t_{10}$. Although not shown in FIG. 8B for simplicity, the SAN may transmit an ACK to the UT on the PFCCH to acknowledge reception of the received RL data.

As mentioned above, the resource blocks of the contention-based resources may differ in time, frequency, and size from the resource blocks of the scheduled RL resources. For some implementations, the resource blocks associated with the contention-based resources may be orthogonal to the resource blocks of the scheduled RL resources.

Although depicted in FIG. 8B as lasting until reception of the RL grant by the UT at time $t_8$, the allocation of contention-based resources to the UT may be configurable (and/or dynamically adjusted) by the SAN based, for example, on the amount of loading on the satellite system's resources. For example, for at least one other implementation, the UT may be allocated only enough contention-based resources to transmit the BSR to the SAN.

In other implementations, the UT may terminate the transmission of data on the contention-based resources after expiration of the time period 820. For example, FIG. 8C shows a timing diagram depicting another example operation 800C for transmitting data from the UT to the SAN in accordance with example implementations.

Figure 8C:
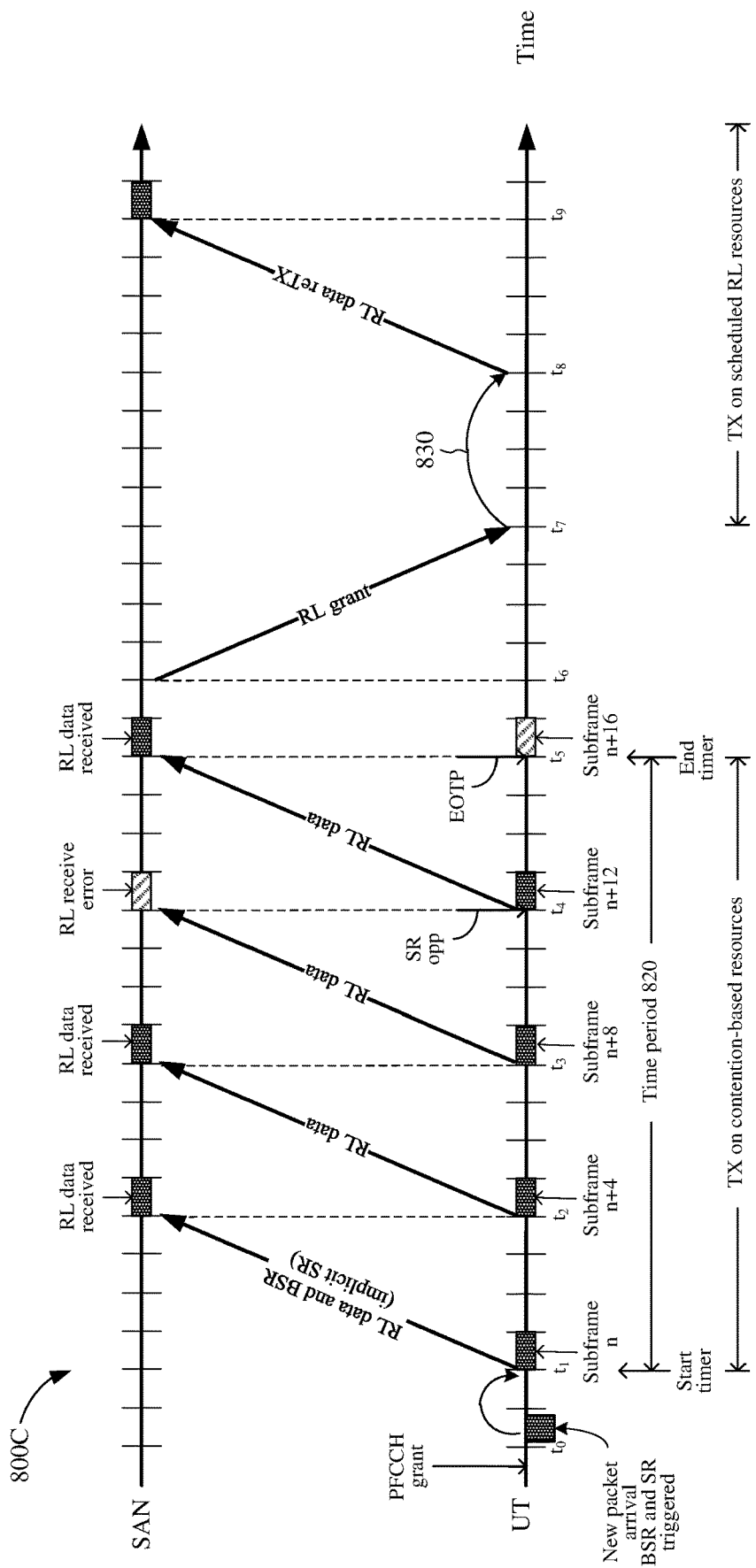
FIG. 8C shows a timing diagram depicting another example operation for transmitting data from a UT to a network controller via a satellite using contention-based resources and return link resources granted by the network controller.

The example operation 800C of FIG. 8C is similar to the example operation 800B of FIG. 8B except for the conditions upon which the contention-based resources allocated to the UT may be suspended or terminated. More specifically, for the example operation 800C, the UT may start the contention-based resources timer to commence the time period 820 at time $t_1$. For other implementations, the UT may commence the time period 820 in response to the triggering or the generation of the BSR, for example, just after time $t_0$. During the time period 820, the UT may transmit RL data using allocated subframes of the contention-based resources in the manner described above with respect to FIG. 8B. Upon expiration of the time period 820 at time $t_5$, which may indicate suspension of the contention-based resources allocated by the SAN, the UT may terminate data transmissions on the contention-based resources of satellite system 100. In this manner, the UT may prevent additional data transmissions on the contention-based resources after expiration of the time period 820 at time $t_5$ (denoted in FIG. 8C as EOTP). Thus, in some aspects, expiration of the time period 820 (e.g., as indicated by the contention-based resource timer reaching a zero value) may operate as an "off-trigger" that suspends or terminates the allocation of contention-based resources to the UT.

As mentioned above, the UT may include a contention-based resource timer that determines when the time period 820 expires. In some aspects, the initial value of the contention-based resource timer (and thus the duration of the time period 820) may be configured by a radio resource control (RRC) associated with the SAN. For at least some implementations, there may be no implicit release of the shared contention-based resources (e.g., the contention-based resources may not be reclaimed by the SAN if a corresponding group of UTs does not transmit data thereon for a given time period). Instead, the shared contention-based resources may be available to the corresponding group of UTs for each duration of the time period 820. The RRC may select a duration of the time period 820 that achieves an optimal balance between the duration of the time period 820 and the likelihood of collisions on the shared contention-based resources. For example, while increasing the time period 820 may reduce UT transmission delays, it may increase the likelihood of collisions on the shared contention-based resources. Conversely, while decreasing the time period 820 may decrease the likelihood of collisions, it may increase UT transmission delays. In some aspects, the RRC may select a value for the time period 820 that corresponds to the time period within which the UT may expect to receive a grant of return link resources. For one example, the RRC may select a value of 40 ms for the time period 820 (although other time values may be used).

The RRC may configure the contention-based resources in both time and frequency. More specifically, in the frequency domain, the RRC may allocate various numbers of resource blocks to a given group of UTs. For example, in some operating environments, the RRC may allocate a relatively small number of resource blocks (e.g., 2 resource blocks) to a group of UTs, and in other operating environments, the RRC may allocate a relatively large number of resource blocks (e.g., 50 resource blocks) to the group of UTs. In the time domain, the RRC may allocate various numbers of subframes to the group of UTs for data transmissions. For example, in some operating environments, the RRC may allocate every other subframe to the group of UTs for data transmissions, and in other operating environments, the RRC may allocate every third subframe (or every fifth subframe, every tenth subframe, and so on) to the group of UTs for data transmissions.

As mentioned above, the contention-based resources of satellite system 100 may be shared by a group of UTs. In some implementations, the SAN may assign, to each UT within a given group of UTs, a unique demodulation reference signal (DM-RS) shift to be applied on transmitted reference symbols. Thereafter, each UT within the group of UTs may transmit data on the contention-based resources using its assigned DM-RS shift value. In some aspects, 12 unique DM-RS shifts may be available, thereby allowing the SAN to distinguish transmissions from up to 12 different UTs.

If there is a collision on the contention-based resources (e.g., if more than one UT transmits data on the contention-based resources at the same time), the SAN may be able to identify which of the UTs attempted to transmit data based on the DM-RS shifts associated with the received signals. More specifically, because the unique DM-RS shifts assigned to the group of UTs are orthogonal to one another, the SAN may identify which UTs attempted to transmit data by decoding the DM-RS shifts. Thus, although data transmitted from the identified UTs may be lost due to collisions, the SAN may request data retransmissions from the identified UTs, for example, using a hybrid automatic repeat request (HARQ) operation. HARQ is a method by which a receiving device (e.g., the SAN) may request retransmission of data that was received in error (e.g., from the UTs identified by DM-RS shifts). More specifically, HARQ allows for buffering and combining of incorrectly received data (e.g., packets, frames, PDUs, MPDUs, etc.) to potentially reduce the number of retransmissions needed to properly reconstruct a particular unit of data. For some implementations, the SAN may immediately transmit RL grants to the UTs identified in the collisions, for example, as depicted in the example of FIG. 8B.

As mentioned above, the RRC may select the duration of the time period 820. More specifically, the RRC may define a periodicity of the allocated contention-based resources. In some aspects, each allocation of contention-based resources may include between approximately 10 and 640 subframes. In some implementations, the SAN may activate or allocate the contention-based resources by transmitting a signal to a corresponding group of UTs on the PFCCH associated with a given satellite 300. In some aspects, the signal may also indicate whether the RL grant is semi-persistent or dynamic. In other aspects, the RL grant may include a special field to carry the contention-based resources activation signal, which in turn may be scrambled by a contention-based radio network temporary identifier (C-RNTI).

Figure 9:
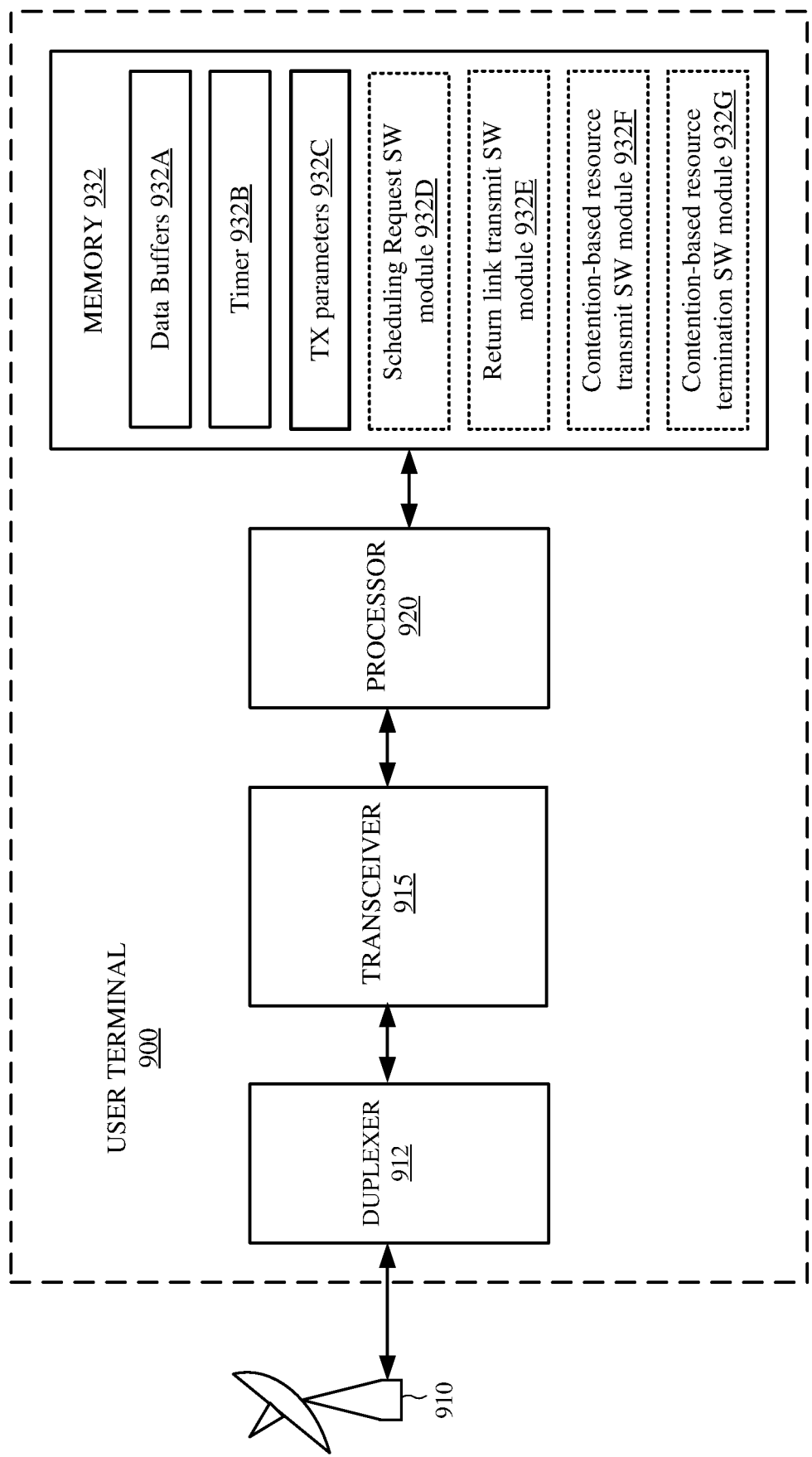
FIG. 9 shows a block diagram of an example UT in accordance with example implementations.

FIG. 9 is a block diagram of a user terminal (UT) 900 in accordance with example implementations. The UT 900, which may be one implementation of the UT 400 of FIG. 1, may include at least an antenna 910, a duplexer 912, a transceiver 915, a processor 920, and a memory 932. The duplexer 912, which may correspond to the duplexer 412 of FIG. 4, may selectively route signals received from one or more satellites via antenna 910 to transceiver 915, and may selectively route signals from transceiver 915 to antenna 910 for transmission to one or more satellites. In some aspects, antenna 910 may be a directional antenna. Further, although UT 900 is shown in FIG. 9 as including only one antenna 910, for other implementations, UT 900 may include any suitable number of antennas.

The transceiver 915, which may correspond to the analog receiver 414, digital receivers 416A-416N, transmit modulator 426, and/or analog transmit power 430 of FIG. 4, may be coupled to antenna 910 via duplexer 912. More specifically, the transceiver 915 may be used to transmit signals to and receive signals from a number of satellites 300. Although not shown in FIG. 9 for simplicity, the transceiver 915 may include any suitable number of transmit chains and/or may include any suitable number of receive chains.

The processor 920, which may be one implementation of the control processor 420 of FIG. 4, is coupled to transceiver 915 and to memory 932. The processor 920 may be any suitable one or more processors capable of executing scripts or instructions of one or more software programs stored in the UT 900 (e.g., within memory 932).

The memory 932, which may be one implementation of memory 432 of FIG. 4, may include data buffers 932A to store data (e.g., received from one or more associated UEs 500) for transmission to the SAN via one or more satellites 300.

The memory 932 may include a timer 932B that determines when the UT 900 is to terminate data transmissions on the contention-based resources of the satellite system 100. As described above with respect to FIG. 8C, the timer 932B may be set to an initial value that corresponds to the time period 820 selected by the RRC, and may be commenced in response to a triggering of the scheduling request.

The memory 932 may include a transmission (TX) parameters table 932C that stores a number of parameters associated with the allocation of shared contention-based resources to the UT 900. For example, the TX parameters table 932C may store a DM-RS shift assigned by the SAN, may store an indication of the time and/or frequency allocations of the contention-based resources (e.g., which resource blocks and/or which subframes may be used by UT 900), and may store other information pertaining to the allocation of contention-based resources to UT 900.

The memory 932 may include a non-transitory computer-readable storage medium (e.g., one or more nonvolatile memory elements, such as EPROM, EEPROM, Flash memory, a hard drive, and so on) that may store the following software modules (SW):
- a scheduling request SW module 932D to facilitate the triggering and/or transmission of a request for scheduled return link resources of satellite system 100, for example, as described for one or more operations of FIGS. 11A-11C and 12A-12C;
- a return link transmit SW module 932E to facilitate the transmission of data to the SAN based on dynamically scheduled grants of return link resources received from the SAN, for example, as described for one or more operations of FIGS. 11A-11C and 12A-12C;
- a contention-based resource transmit SW module 932F to facilitate the transmission of data to the SAN using contention-based resources of satellite system 100, for example, as described for one or more operations of FIGS. 11A-11C and 12A-12C; and
- a contention-based resource termination SW module 932G to terminate data transmissions on the contention-based resources of satellite system 100, for example, as described for one or more operations of FIGS. 11A-11C and 12A-12C.

Each software module includes instructions that, when executed by processor 920, cause the UT 900 to perform the corresponding functions. The non-transitory computer-readable medium of memory 932 thus includes instructions for performing all or a portion of the operations of FIGS. 11A-11C and 12A-12C.

For example, processor 920 may execute the scheduling request SW module 932D to facilitate the triggering and/or transmission of a request for scheduled return link resources of satellite system 100. Processor 920 may execute the return link transmit SW module 932E to facilitate the transmission of data to the SAN based on dynamically scheduled grants of return link resources received from the SAN.

Processor 920 may execute the contention-based resource transmit SW module 932F to facilitate the transmission of data to the SAN using contention-based resources of satellite system 100. Processor 920 may execute the contention-based resource termination SW module 932G to terminate data transmissions on the contention-based resources of satellite system 100.

Figure 10:
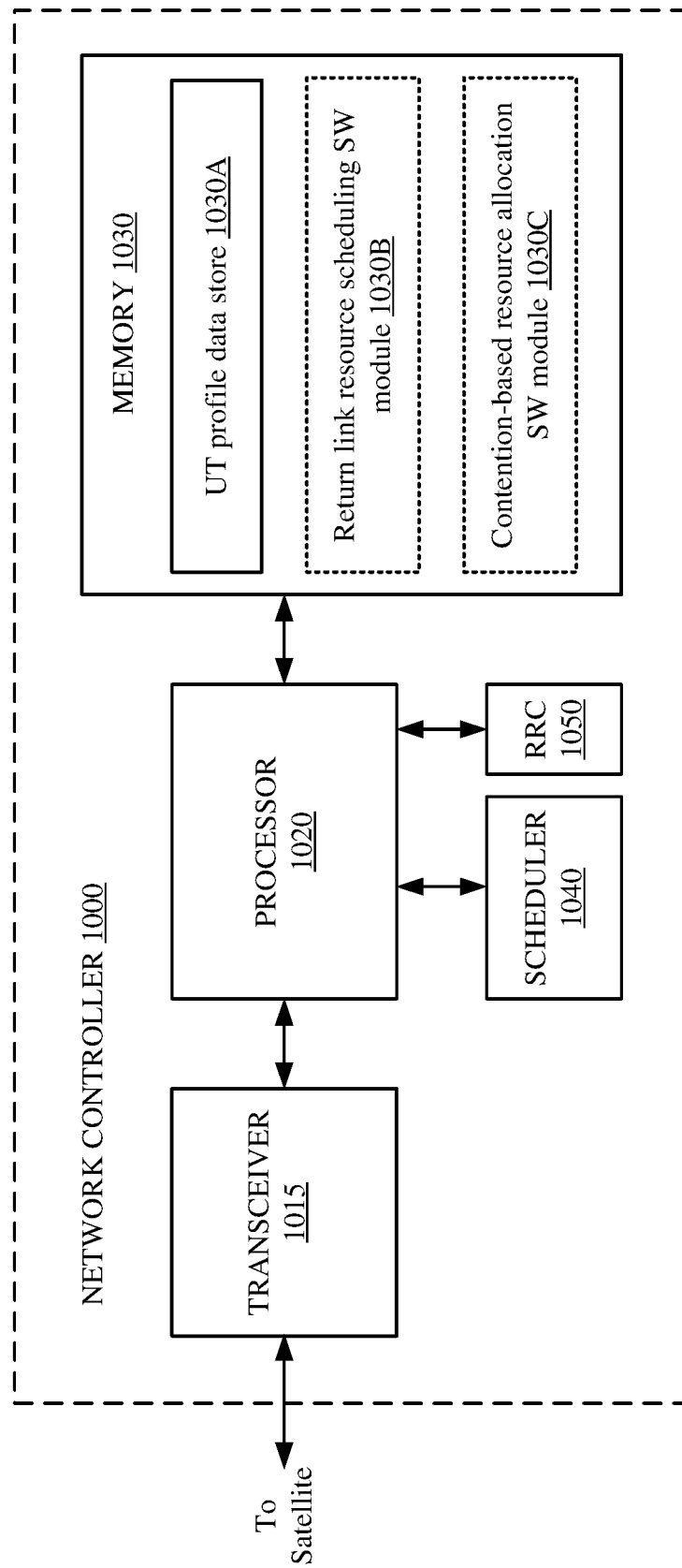
FIG. 10 shows a block diagram of an example network controller in accordance with example implementations.

FIG. 10 shows a block diagram of an example network controller 1000 in accordance with example implementations. The network controller 1000, which may be one implementation of the SAN 150 of FIG. 1, may include at least an antenna (not shown for simplicity), a transceiver 1015, a processor 1020, a memory 1030, a scheduler 1040, and a radio resource control (RRC) 1050. The transceiver 1015 may be used to transmit signals to and receive signals from a number of UTs 400 via one or more satellites 300. Although not shown in FIG. 10 for simplicity, the transceiver 1015 may include any suitable number of transmit chains and/or may include any suitable number of receive chains.

The scheduler 1040 may dynamically schedule return link resources for a number of UTs, for example, by transmitting RL grant messages to the UTs. The scheduler 1040 may also schedule and/or otherwise allocate shared contention-based resources to a group of UTs. The scheduler 1040 may select the DM-RS shifts to be assigned to each UT in a corresponding group of UTs. The scheduler 1040 may schedule dynamic grants of return link resources, may select the size of the granted return link resources (e.g., based on received BSRs), and/or may schedule the allocation of contention-based resources to a group of UTs.

The RRC 1050 may configure the contention-based resources in both time and frequency. As described above, the RRC 1050 may allocate various numbers of resource blocks to a given group of UTs for data transmissions, and/or may allocate various numbers of subframes to the group of UTs for data transmissions. The RRC 1050 may also select the duration of the time period 820, for example, as described above with respect to FIG. 8C.

The processor 1020 is coupled to transceiver 1015, to memory 1030, to scheduler 1040, and to RRC 1050. The processor 1020 may be any suitable one or more processors capable of executing scripts or instructions of one or more software programs stored in the network controller 1000 (e.g., within memory 1030).

The memory 1030 may include a UT profile data store 1030A to store profile information for a plurality of UTs. The profile information for a particular UT may include, for example, the DM-RS shift assigned to the UT, transmission history of the UT, location information of the UT, and any other suitable information describing or pertaining to the operation of the UT.

The memory 1030 may include a non-transitory computer-readable storage medium (e.g., one or more nonvolatile memory elements, such as EPROM, EEPROM, Flash memory, a hard drive, and so on) that may store the following software modules (SW):

- a return link resource scheduling SW module 1030B to facilitate the dynamic scheduling of return link resources for one or more UTs, for example, as described for one or more operations of FIGS. 11A-11C and 12A-12C; and
- a contention-based resource allocation SW module 1030C to facilitate the allocation of shared contention-based resources of satellite system 100 to a group of UTs, for example, as described for one or more operations of FIGS. 11A-11C and 12A-12C.

Each software module includes instructions that, when executed by processor 1020, cause the network controller 1000 to perform the corresponding functions. The non-transitory computer-readable medium of memory 1030 thus includes instructions for performing all or a portion of the operations of FIGS. 11A-11C and 12A-12C.

For example, processor 1020 may execute the return link resource scheduling SW module 1030B to facilitate the dynamic scheduling of return link resources for one or more UTs. Processor 1020 may execute the contention-based resource allocation SW module 1030C to facilitate the allocation of shared contention-based resources of satellite system 100 to a group of UTs.

Figure 11A:
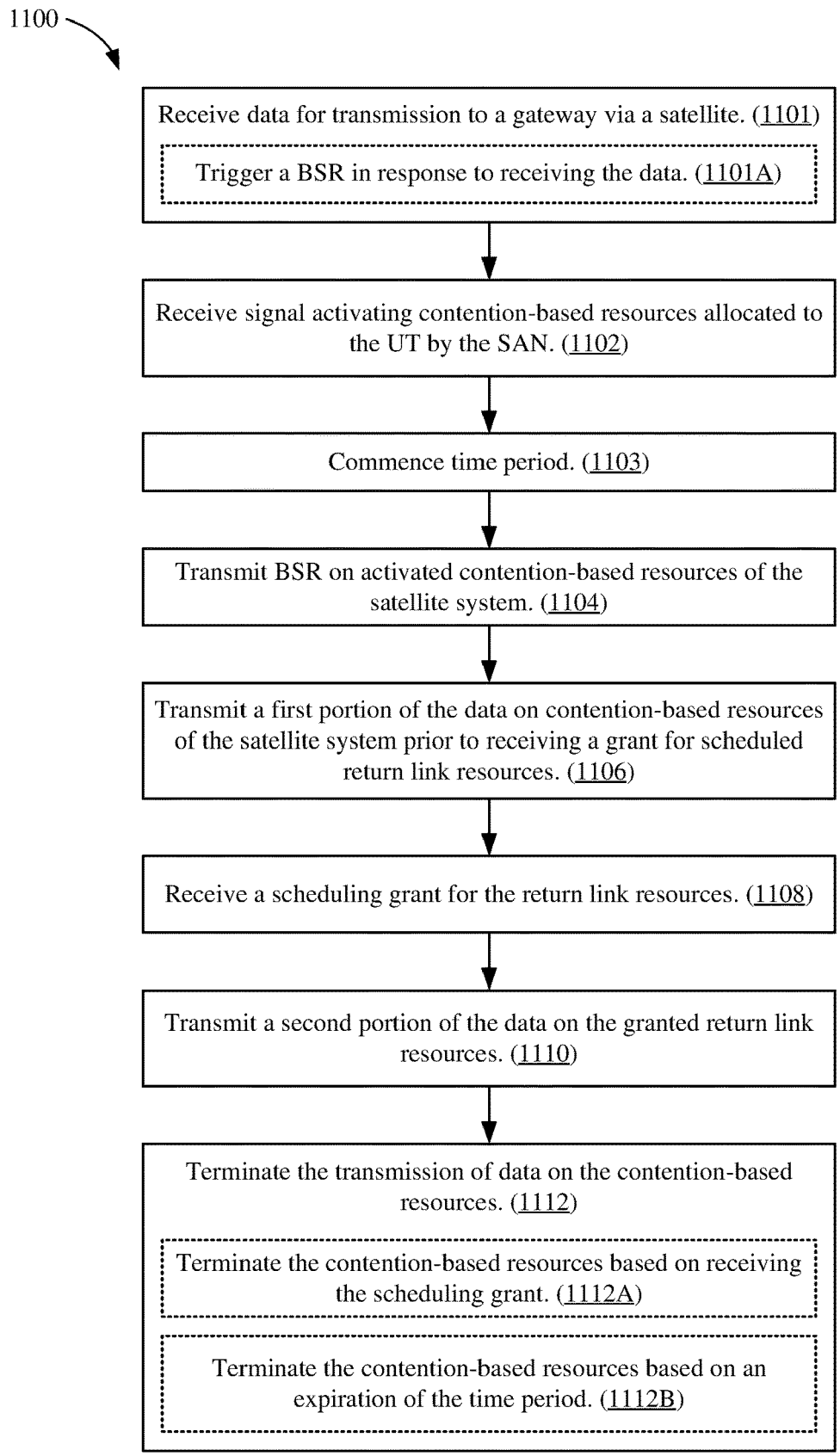
FIG. 11A shows an illustrative flowchart depicting an example operation for transmitting data from a UT to a network controller via a satellite using contention-based resources and return link resources granted by the network controller.

FIG. 11A shows an illustrative flowchart depicting an example operation 1100 for transmitting data from a UT to a network controller via a satellite in accordance with example implementations. The example operation 1100 may be performed by the UT 900 depicted in FIG. 9. However, it is to be understood that operation 1100 may be performed by other suitable devices capable of transmitting data to a network controller via one or more satellites (e.g., satellites 300 of FIG. 1).

First, the UT 900 may receive data for transmission to a gateway via a satellite (1101). In some aspects, reception of the data may cause the UT 900 to trigger or generate a buffer status report (BSR) indicating an amount of queued return link data stored in the UT 900 (1101A). The UT 900 may receive an activation signal that activates contention-based resources allocated to the UT 900 by the SAN (1102). As described above with respect to FIG. 10, the RRC 1050 may configure the contention-based resources allocated to the UT 900, and the SAN may transmit the activation signal to the UT 900 on the PFCCH. If scheduled RL resources are available to the UT 900 when the BSR is triggered (e.g., the UT has received a grant for PRSCH resources), then the UT 900 may transmit the buffered data on the scheduled RL resources.

Conversely, if scheduled RL resources are not available to the UT 900 (e.g., the PRSCH is not available to the UT 900 for RL data transmissions), then the triggering or generation of the BSR may operate as the on-trigger and cause the UT 900 to commence the time period, for example, by starting the timer 932B of FIG. 9 (1103). As described above with respect to FIGS. 8B-8C, in some aspects, the time period may be commenced in response to the first subframe of the activated contention-based resources becoming available to the UT 900 for RL data transmissions. In other aspects, the time period may be commenced in response to triggering or generation of the BSR.

Assuming that the contention-based resources allocated to the UT 900 have been activated by the SAN, then the UT 900 may transmit the BSR on the activated contention-based resources (1104). The UT 900 may transmit a first portion of the data on contention-based resources of the satellite system prior to receiving a grant for scheduled return link resources of the satellite system (1106).

The UT 900 may subsequently receive a scheduling grant for the return link resources (1108). In response thereto, the UT 900 may transmit a second portion of the data on the granted return link resources (1110).

The UT 900 may terminate the transmission of data on the contention-based resources (1112). In some aspects, the UT 900 may terminate the contention-based resources based on receiving the scheduling grant (1112A). In other aspects, the UT 900 may terminate the contention-based resources based on an expiration of the time period associated with the contention-based resource timer (e.g., the timer 932B of FIG. 9) (1112B).

Figure 11B:
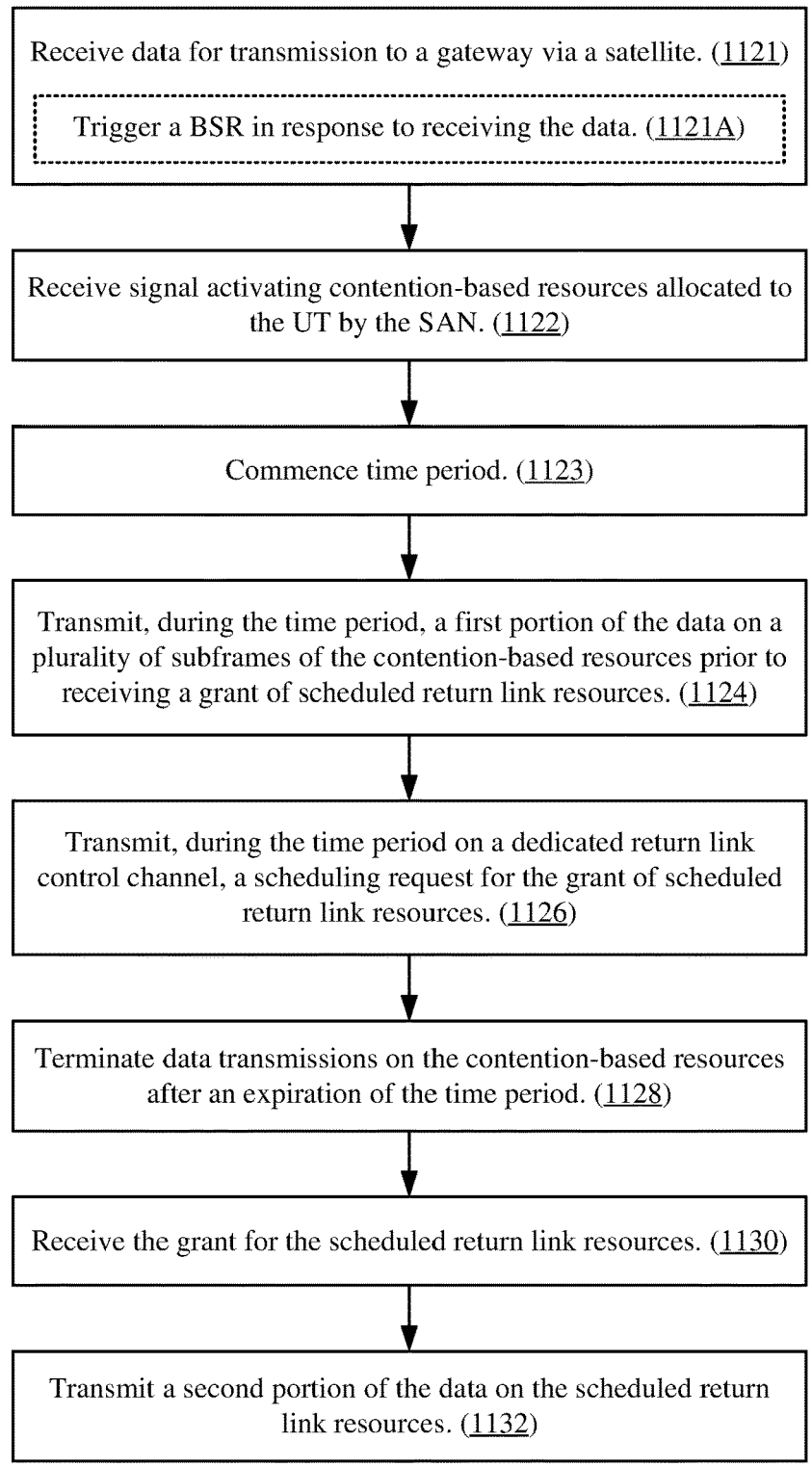
FIG. 11B shows an illustrative flowchart depicting an example operation for transmitting data from a UT to a network controller via a satellite using contention-based resources and return link resources granted by the network controller.

FIG. 11B shows an illustrative flowchart depicting an example operation 1120 for transmitting data from a UT to a network controller via a satellite in accordance with example implementations. The example operation 1120 may be performed by the UT 900 depicted in FIG. 9. However, it is to be understood that operation 1120 may be performed by other suitable devices capable of transmitting data to a network controller via one or more satellites (e.g., satellites 300 of FIG. 1).

First, the UT 900 may receive data for transmission to a gateway via a satellite (1121). In some aspects, reception of the data may cause the UT 900 to trigger generation of a buffer status report (BSR) indicating an amount of queued return link data stored in the UT (1121A). The UT 900 may receive an activation signal that activates contention-based resources allocated to the UT 900 by the SAN (1122). As described above with respect to FIG. 10, the RRC 1050 may configure the contention-based resources allocated to the UT 900, and the SAN may transmit the activation signal to the UT 900 on the PFCCH. If scheduled RL resources are available to the UT 900 when the BSR is triggered (e.g., the UT 900 has received a grant for PRSCH resources), then the UT 900 may begin transmit the buffered data on the scheduled RL resources.

Conversely, if scheduled RL resources are not available to the UT 900 (e.g., the PRSCH is not available to the UT 900 for RL data transmissions), then the triggering or the generation of the BSR may operate as the on-trigger and cause the UT 900 to commence the time period, for example, by starting the timer 932B of FIG. 9 (1123). As described above with respect to FIGS. 8B-8C, in some aspects, the time period may be commenced in response to the first subframe of the activated contention-based resources becoming available to the UT 900 for RL data transmissions. In other aspects, the time period may be commenced in response to triggering or generation of the BSR.

Assuming that the contention-based resources allocated to the UT 900 have been activated by the SAN, then the UT 900 may transmit, during the time period, a first portion of the data on a plurality of subframes of the contention-based resources of the satellite system prior to receiving a grant of scheduled return link resources (1124). The UT 900 may transmit, during the time period on a dedicated physical return link control channel (PRCCH), a scheduling request for the grant of scheduled return link resources (1126). The UT 900 may terminate data transmissions on the contention-based resources after an expiration of the time period irrespective of collisions on the contention-based resources (1128).

The UT 900 may subsequently receive a grant for the scheduled RL resources (1130). In response thereto, the UT 900 may transmit a second portion of the data on the scheduled return link resources (1132). In some aspects, the UT 900 may receive the grant for the scheduled return link resources prior to the expiration of the time period, and may transmit a second portion of the data on the scheduled return link resources during the time period. The UT 900 may terminate data transmissions on the contention-based resources in response to receiving the grant for the scheduled RL resources. In other aspects, the UT 900 may receive the grant for the scheduled RL resources after the expiration of the time period, and may transmit a second portion of the data on the scheduled RL resources after the expiration of the time period. The UT 900 may prevent additional data transmissions on the contention-based resources until a subsequent scheduling request is triggered (e.g., in response to receiving additional data for transmission to the gateway via the satellite).

Figure 11C:
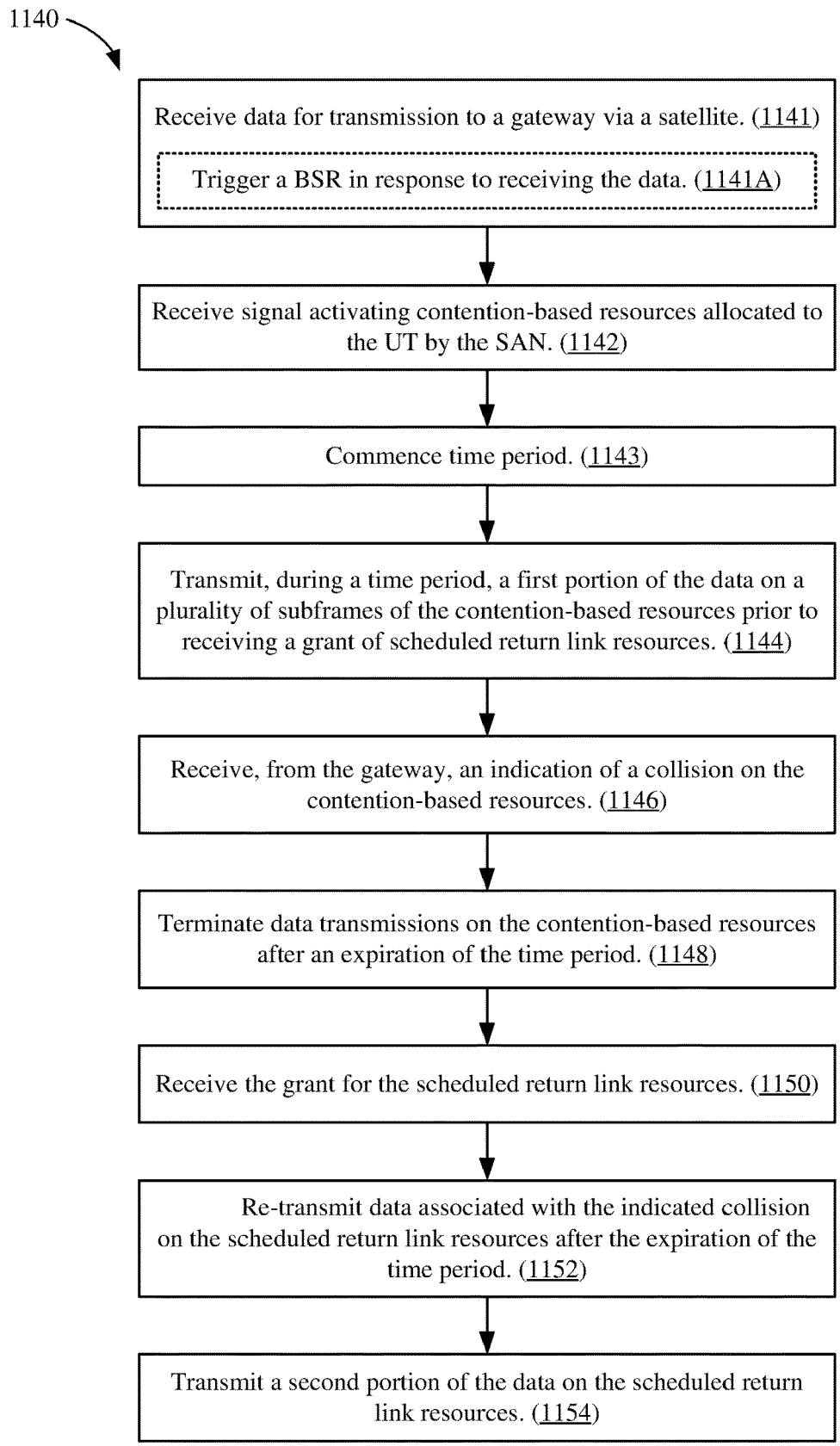
FIG. 11C shows an illustrative flowchart depicting an example operation for transmitting data from a UT to a network controller via a satellite using contention-based resources and re-transmitting, on return link resources granted by the network controller, data associated with collisions on the contention-based resources.

FIG. 11C shows an illustrative flowchart depicting an example operation 1140 for transmitting data from a UT to a network controller via a satellite in accordance with example implementations. The example operation 1140 may be performed by the UT 900 depicted in FIG. 9. However, it is to be understood that operation 1140 may be performed by other suitable devices capable of transmitting data to a network controller via one or more satellites (e.g., satellites 300 of FIG. 1).

First, the UT 900 may receive data for transmission to a gateway via a satellite (1141). In some aspects, reception of the data may cause the UT 900 to trigger generation of a buffer status report (BSR) indicating an amount of queued return link data stored in the UT 900 (1141A). The UT 900 may receive an activation signal that activates contention-based resources allocated to the UT 900 by the SAN (1142). As described above with respect to FIG. 10, the RRC 1050 may configure the contention-based resources allocated to the UT 900, and the SAN may transmit the activation signal to the UT 900 on the PFCCH. If scheduled RL resources are available to the UT 900 when the BSR is triggered (e.g., the UT 900 has received a grant for PRSCH resources), then the UT may transmit the buffered data on the scheduled RL resources, and generation of the BSR may not operate as the on-trigger for the contention-based resources.

Conversely, if scheduled RL resources are not available to the UT 900 when the BSR is triggered (e.g., the UT 900 has not received a grant for PRSCH resources), then triggering of the BSR may operate as the on-trigger and cause the UT 900 to commence the time period, for example, by starting the timer 932B of FIG. 9 (1143). As described above with respect to FIGS. 8B-8C, in some aspects, the time period may be commenced in response to the first subframe of the activated contention-based resources becoming available to the UT 900 for RL data transmissions. In other aspects, the time period may be commenced in response to triggering or generation of the BSR.

The UT 900 may transmit, during a time period, a first portion of the data on a plurality of subframes of the contention-based resources of the satellite system prior to receiving a grant of scheduled return link resources (1144). The UT 900 may receive, from the gateway, an indication of a collision on the contention-based resources (1146). The UT may terminate data transmissions on the contention-based resources after an expiration of the time period irrespective of collisions on the contention-based resources (1148).

The UT 900 may subsequently receive a grant for the scheduled return link resources (1150). In response thereto, the UT 900 may re-transmit data associated with the indicated collision on the scheduled return link resources after the expiration of the time period (1152). Thereafter, the UT may transmit a second portion of the data on the scheduled return link resources (1154). In some aspects, the UT 900 may receive the grant for the scheduled return link resources prior to the expiration of the time period, and may transmit a second portion of the data on the scheduled return link resources during the time period. The UT 900 may terminate data transmissions on the contention-based resources in response to receiving the grant.

Figure 12A:
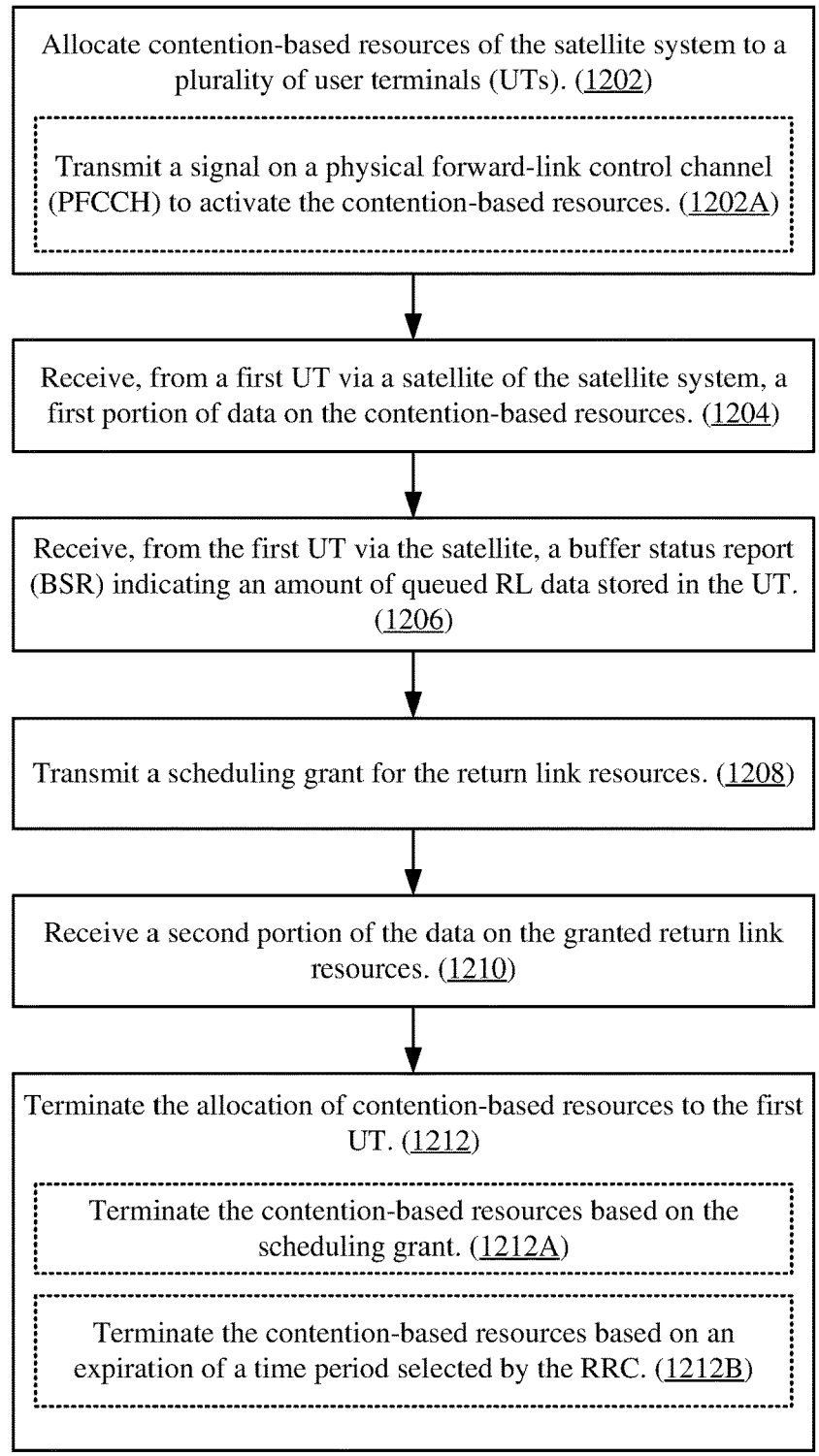
FIG. 12A shows an illustrative flowchart depicting an example operation for receiving data from a UT via a satellite using contention-based resources and return link resources granted by the network controller.

FIG. 12A shows an illustrative flowchart depicting an example operation 1200 for receiving data from a UT via a satellite in accordance with example implementations. The example operation 1200 may be performed by the network controller 1000 depicted in FIG. 10. However, it is to be understood that operation 1200 may be performed by other suitable devices capable of receiving data from a number of UTs (e.g., UTs 400) via one or more satellites (e.g., satellites 300 of FIG. 1).

First, the network controller 1000 may allocate contention-based resources of the satellite system to a plurality of user terminals (UTs) (1202). In some aspects, the network controller 1000 may transmit an activation signal on a physical forward-link control channel (PFCCH) to activate the contention-based resources (1202A).

If the network controller 1000 has not granted PRSCH resources to the plurality of UTs, then the network controller 1000 may receive, from a first UT via a satellite of the satellite system, a first portion of data on the contention-based resources (1204). The network controller 1000 may also receive, from the first UT via the satellite, a buffer status report (BSR) (1206). In some aspects, reception of data and/or the BSR from the first UT on the contention-based resources may operate as an implicit scheduling request for return link resources of the satellite system.

The network controller 1000 may transmit a scheduling grant for the return link resources (1208). Then, the network controller 1000 may receive a second portion of the data on the granted return link resources (1210).

The network controller 1000 may terminate the allocation of contention-based resources to the first UT (1212). In some aspects, the network controller 1000 may terminate the contention-based resources based on the scheduling grant (1212A). In other aspects, the network controller 1000 may terminate the contention-based resources based on an expiration of a time period selected by the RRC (1212B).

Figure 12B:
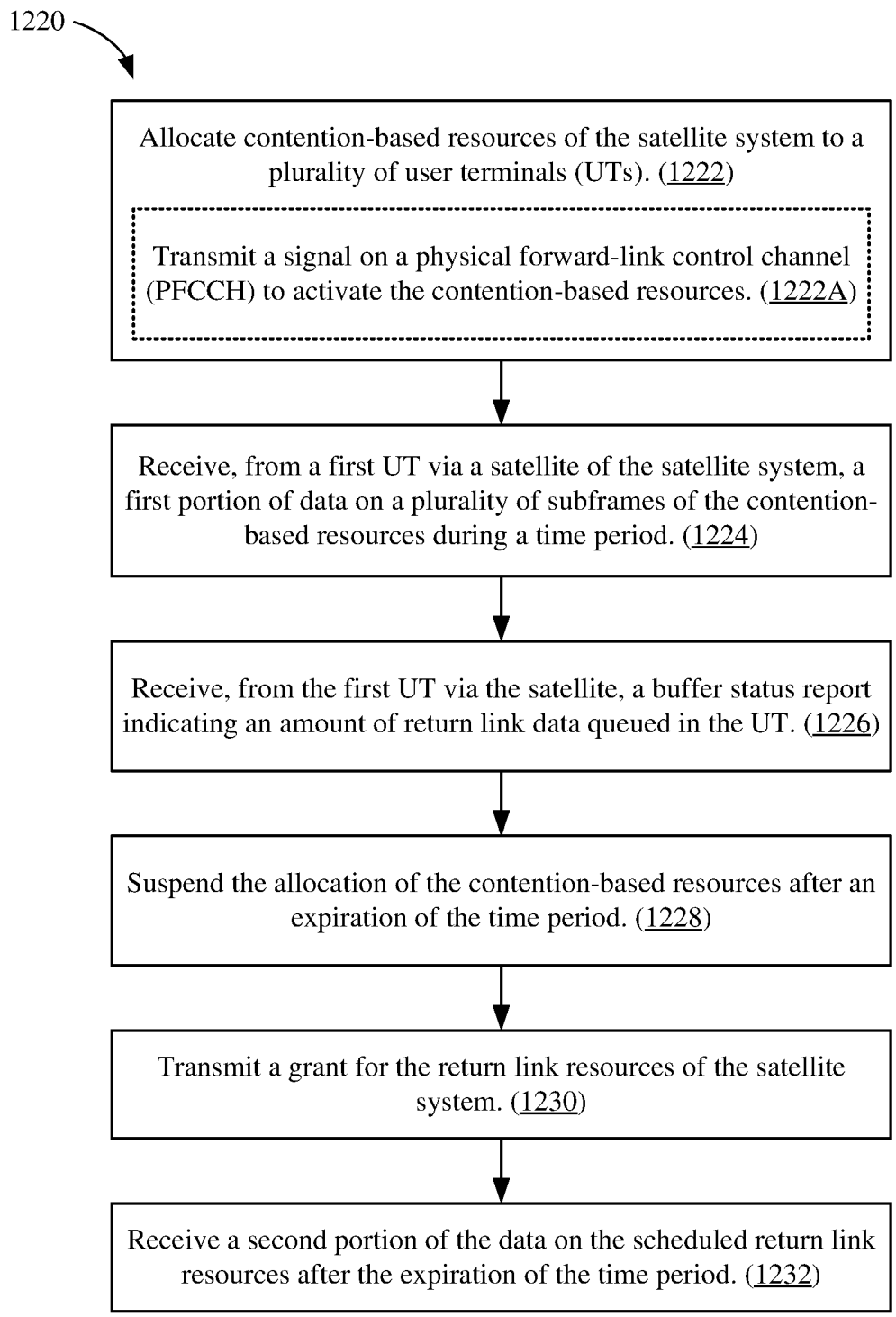
FIG. 12B shows an illustrative flowchart depicting an example operation for receiving data from a UT via a satellite using contention-based resources and return link resources granted by the network controller.

FIG. 12B shows an illustrative flowchart depicting an example operation 1220 for receiving data from a UT via a satellite in accordance with example implementations. The example operation 1220 may be performed by the network controller 1000 depicted in FIG. 10. However, it is to be understood that operation 1220 may be performed by other suitable devices capable of receiving data from a number of UTs (e.g., UTs 400) via one or more satellites (e.g., satellites 300 of FIG. 1).

First, the network controller 1000 may allocate contention-based resources of the satellite system to a plurality of UTs (1222). In some aspects, the network controller 1000 may transmit an activation signal on the PFCCH to activate the contention-based resources (1222A).

If the network controller 1000 has not granted PRSCH resources to the plurality of UTs, then the network controller 1000 may receive, from a first UT via a satellite of the satellite system, a first portion of data on a plurality of subframes of the contention-based resources during a time period (1224). The network controller 1000 may receive, from the first UT via the satellite on the contention-based resources, a buffer status report (BSR) indicating an amount of data stored in a buffer of the first UT (1226). The network controller 1000 may then suspend the allocation of the contention-based resources after an expiration of the time period irrespective of collisions on the contention-based resources (1228).

Then, the network controller 1000 may transmit a grant for the return link resources of the satellite system (1230). Thereafter, the network controller 1000 may receive a second portion of the data on the scheduled return link resources after the expiration of the time period (1232).

Figure 12C:
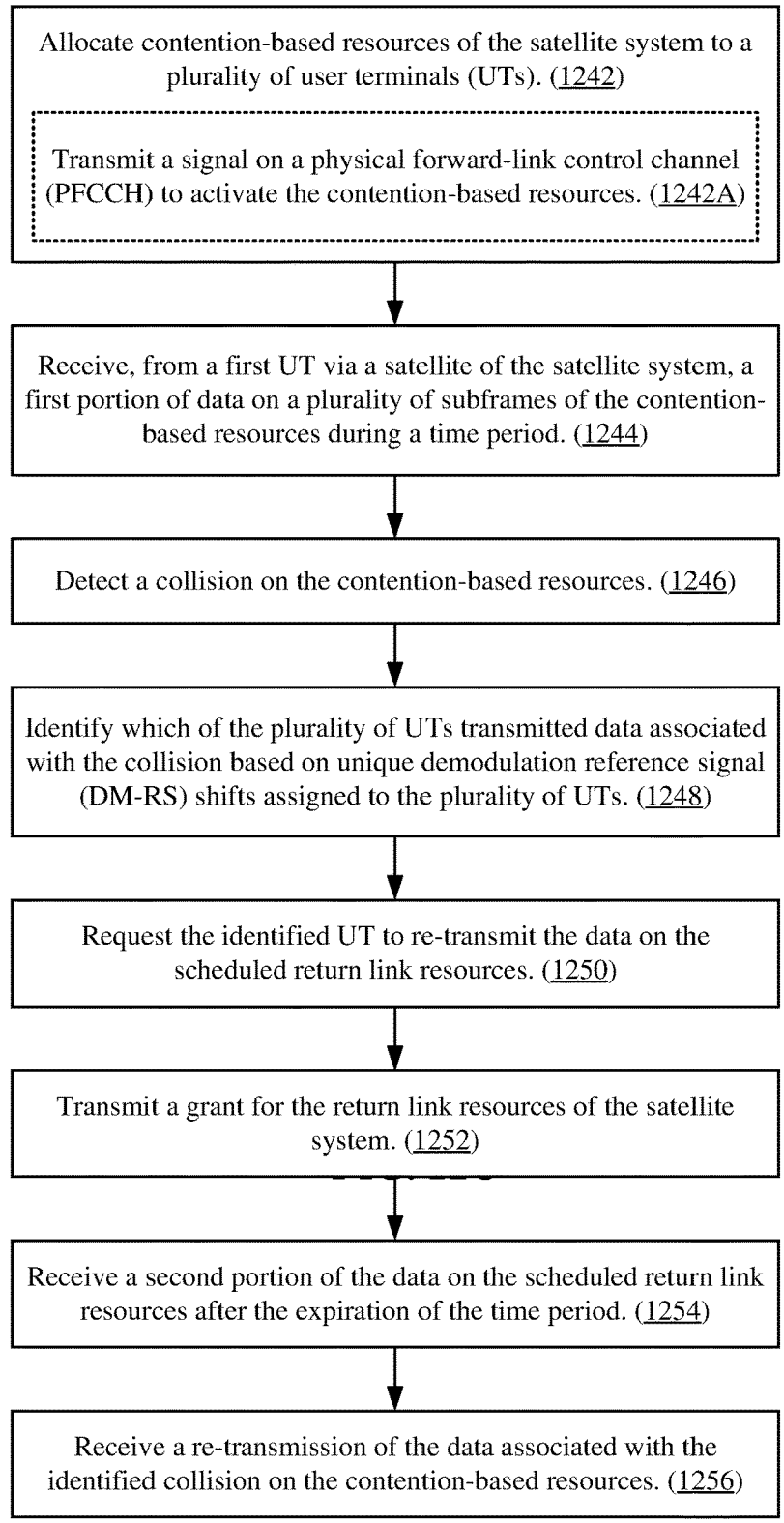
FIG. 12C shows an illustrative flowchart depicting an example operation for receiving data from a UT via a satellite using contention-based resources, detecting a collision on the contention-based resources, and requesting re-transmission of data from an identified UT on return link resources granted by the network controller.

FIG. 12C shows an illustrative flowchart depicting an example operation 1240 for receiving data from a UT via a satellite in accordance with example implementations. The example operation 1240 may be performed by the network controller 1000 depicted in FIG. 10. However, it is to be understood that operation 1240 may be performed by other suitable devices capable of receiving data from a number of UTs (e.g., UTs 400) via one or more satellites (e.g., satellites 300 of FIG. 1).

First, the network controller 1000 may allocate contention-based resources of the satellite system to a plurality of UTs (1242). In some aspects, the network controller 1000 may transmit an activation signal on the PFCCH to activate the contention-based resources (1242A).

If the network controller 1000 has not granted PRSCH resources to the plurality of UTs, then the network controller 1000 may receive, from a first UT via a satellite of the satellite system, a first portion of data on a plurality of subframes of the contention-based resources during a time period (1244). Thereafter, the network controller 1000 may detect a collision on the contention-based resources (1246). The network controller 1000 may identify which of the plurality of UTs transmitted data associated with the collision based on unique demodulation reference signal (DM-RS) shifts assigned to the plurality of UTs (1248). In response thereto, the network controller 1000 may request the identified UT to re-transmit the data on the scheduled return link resources (1250).

Then, the network controller 1000 may transmit a grant for the return link resources of the satellite system (1252). Thereafter, the network controller 1000 may receive a second portion of the data on the scheduled return link resources after the expiration of the time period (1254). In some aspects, the network controller 1000 may receive a re-transmission of the data, from the first UT, that was associated with the detected collision (1256).

Figure 13:
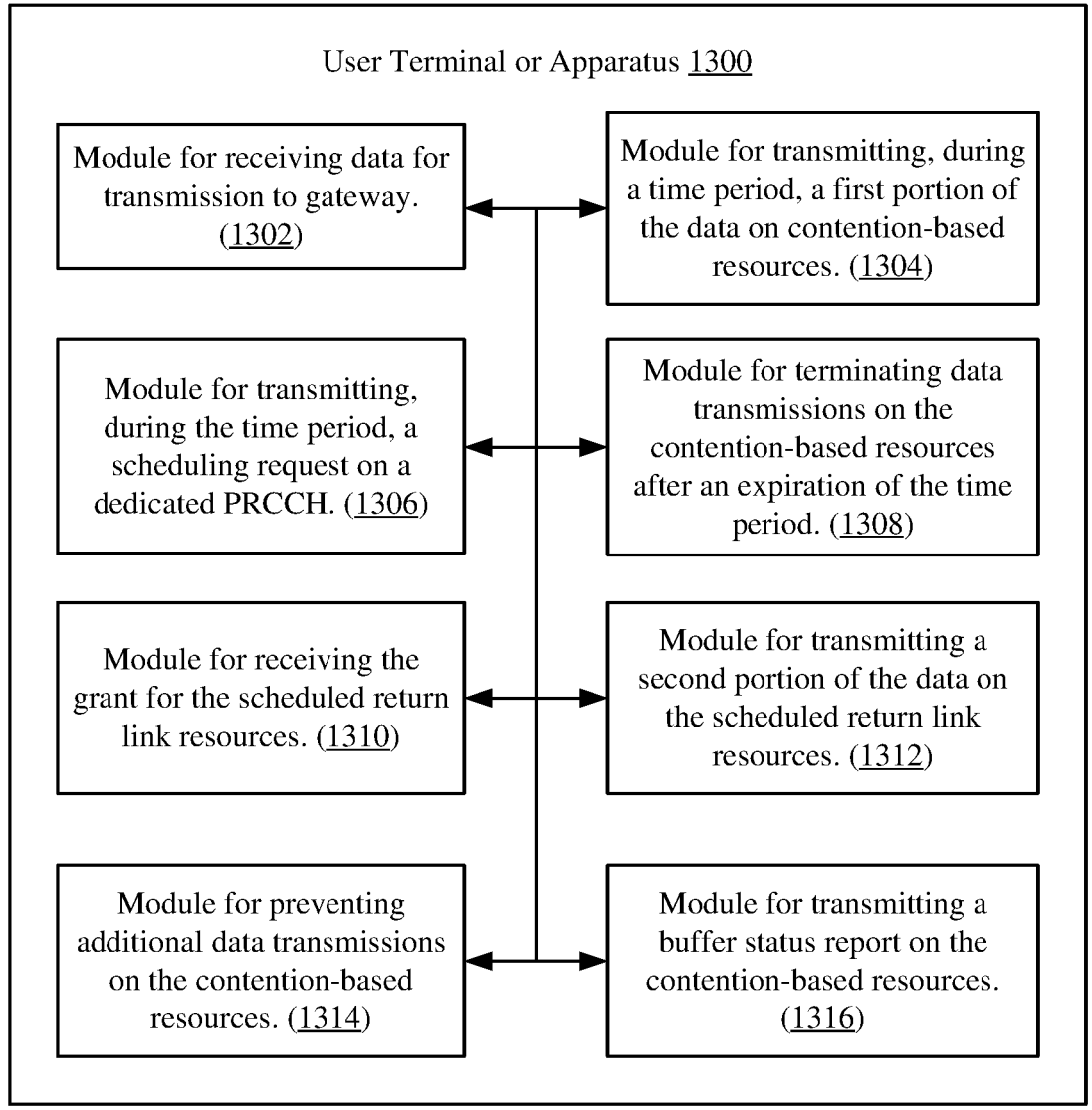
FIG. 13 shows an example user terminal represented as a series of interrelated functional modules.

FIG. 13 shows an example user terminal or apparatus 1300 represented as a series of interrelated functional modules. A module 1302 for receiving data for transmission to a gateway via a satellite may correspond at least in some aspects to, for example, a processor as discussed herein (e.g., processor 920) and/or to a transceiver as discussed herein (e.g., transceiver 915). A module 1304 for transmitting, during a time period, a first portion of the data on contention-based resources of the satellite system may correspond at least in some aspects to, for example, a processor as discussed herein (e.g., processor 920) and/or to a transceiver as discussed herein (e.g., transceiver 915). A module 1306 for transmitting, during the time period, a scheduling request for the grant of scheduled return link resources on a dedicated physical return link control channel (PRCCH) may correspond at least in some aspects to, for example, a processor as discussed herein (e.g., processor 920) and/or to a transceiver as discussed herein (e.g., transceiver 915). A module 1308 for terminating data transmissions on the contention-based resources after an expiration of the time period or upon receiving the grant of scheduled return link resources may correspond at least in some aspects to, for example, a processor as discussed herein (e.g., processor 920) and/or to a transceiver as discussed herein (e.g., transceiver 915). A module 1310 for receiving the grant for the scheduled return link resources may correspond at least in some aspects to, for example, a processor as discussed herein (e.g., processor 920) and/or to a transceiver as discussed herein (e.g., transceiver 915). A module 1312 for transmitting a second portion of the data on the scheduled return link resources may correspond at least in some aspects to, for example, a processor as discussed herein (e.g., processor 920) and/or to a transceiver as discussed herein (e.g., transceiver 915). A module 1314 for preventing additional data transmissions on the contention-based resources may correspond at least in some aspects to, for example, a processor as discussed herein (e.g., processor 920) and/or to a transceiver as discussed herein (e.g., transceiver 915). A module 1316 for transmitting a buffer status report (BSR) on the contention-based resources may correspond at least in some aspects to, for example, a processor as discussed herein (e.g., processor 920) and/or to a transceiver as discussed herein (e.g., transceiver 915).

Figure 14:
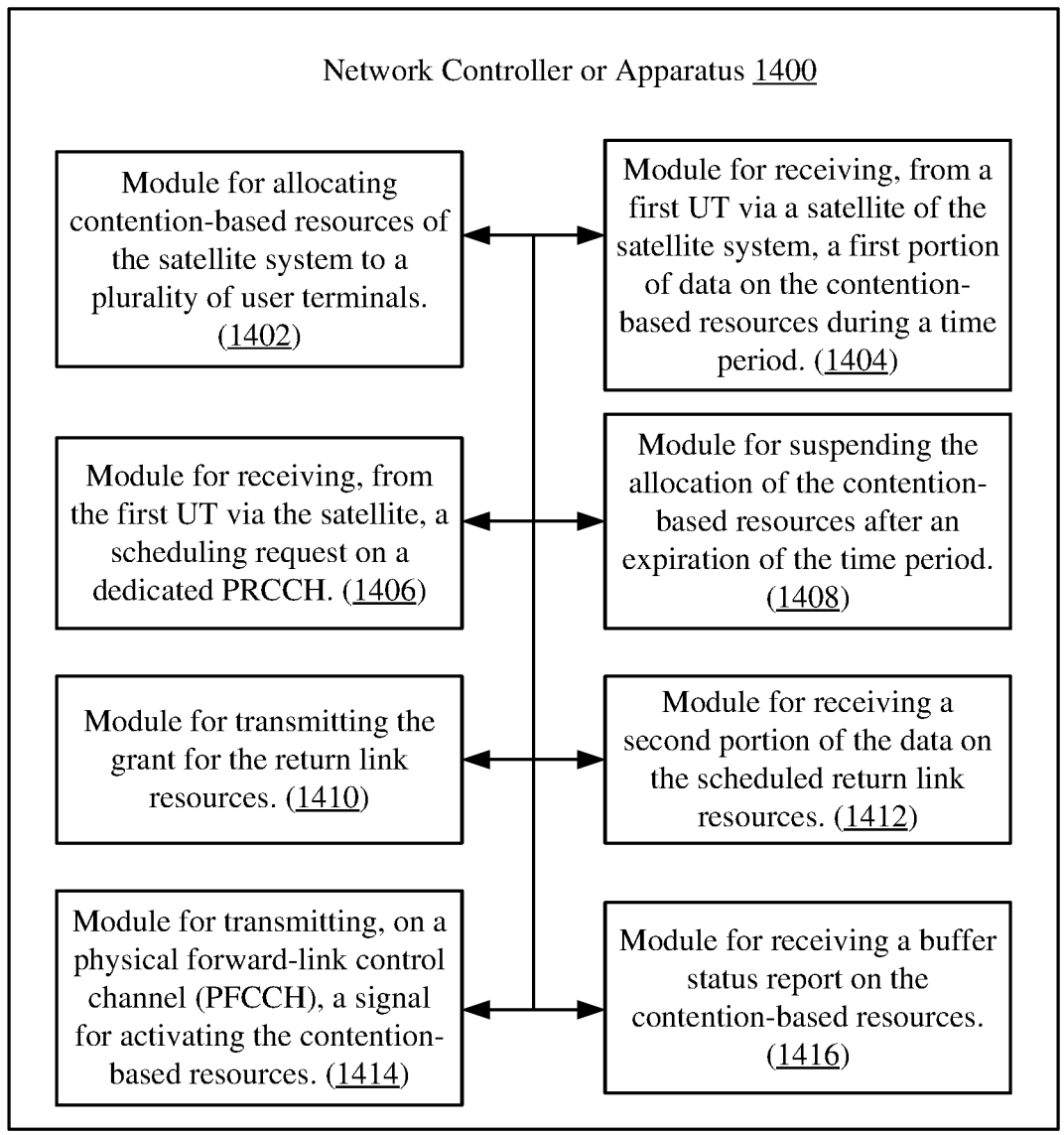
FIG. 14 shows an example network controller represented as a series of interrelated functional modules.

FIG. 14 shows an example network controller or apparatus 1400 represented as a series of interrelated functional modules. A module 1402 for allocating contention-based resources of the satellite system to a plurality of user terminals (UTs) may correspond at least in some aspects to, for example, a processor as discussed herein (e.g., processor 1020) and/or to a transceiver as discussed herein (e.g., transceiver 1015). A module 1404 for receiving, from a first UT via a satellite of the satellite system, a first portion of data on the contention-based resources during a time period may correspond at least in some aspects to, for example, a processor as discussed herein (e.g., processor 1020) and/or to a transceiver as discussed herein (e.g., transceiver 1015). A module 1406 for receiving, from the first UT via the satellite, a scheduling request for return link resources on a dedicated physical return link control channel (PRCCH) may correspond at least in some aspects to, for example, a processor as discussed herein (e.g., processor 1020) and/or to a transceiver as discussed herein (e.g., transceiver 1015). A module 1408 for suspending the allocation of the contention-based resources after an expiration of the time period or upon a grant of scheduled return link resources may correspond at least in some aspects to, for example, a processor as discussed herein (e.g., processor 1020) and/or to a transceiver as discussed herein (e.g., transceiver 1015). A module 1410 for transmitting the grant for the return link resources may correspond at least in some aspects to, for example, a processor as discussed herein (e.g., processor 1020) and/or to a transceiver as discussed herein (e.g., transceiver 1015). A module 1412 for receiving a second portion of the data on the scheduled return link resources may correspond at least in some aspects to, for example, a processor as discussed herein (e.g., processor 1020) and/or to a transceiver as discussed herein (e.g., transceiver 1015). A module 1414 for transmitting, on a physical forward-link control channel (PFCCH), a signal for activating the contention-based resources may correspond at least in some aspects to, for example, a processor as discussed herein (e.g., processor 1020) and/or to a transceiver as discussed herein (e.g., transceiver 1015). A module 1416 for receiving a buffer status report (BSR) on the contention-based resources may correspond at least in some aspects to, for example, a processor as discussed herein (e.g., processor 1020) and/or to a transceiver as discussed herein (e.g., transceiver 1015).

The functionality of the modules of FIGS. 13 and 14 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIGS. 13 and 14, as well as other components and functions described herein, may be implemented using any suitable means. Such means also may be implemented, at least in part, using corresponding structure as taught herein. For example, the components described above in conjunction with the "module for" components of FIGS. 13 and 14 also may correspond to similarly designated "means for" functionality. Thus, in some aspects, one or more of such means may be implemented using one or more of processor components, integrated circuits, or other suitable structure as taught herein.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, one aspect of the disclosure can include a non-transitory computer readable media embodying a method for time and frequency synchronization in non-geosynchronous satellite communication systems. The term "non-transitory" does not exclude any physical storage medium or memory and particularly does not exclude dynamic memory (e.g., conventional random access memory (RAM)) but rather excludes only the interpretation that the medium can be construed as a transitory propagating signal.

While the foregoing disclosure shows illustrative aspects, it should be noted that various changes and modifications could be made herein without departing from the scope of the appended claims. The functions, steps or actions of the method claims in accordance with aspects described herein need not be performed in any particular order unless expressly stated otherwise. Furthermore, although elements may be described or claimed in the singular, the plural is contemplated unless limitation to the singular is explicitly stated. Accordingly, the disclosure is not limited to the illustrated examples and any means for performing the functionality described herein are included in aspects of the disclosure.

What is claimed is:

1. A method of wireless communication in a satellite system, the method performed by a network controller of the satellite system and comprising:
   allocating contention-based resources of the satellite system to a plurality of user terminals (UTs);
   activating the allocated contention-based resources by transmitting an activation signal to the plurality of UTs;
   receiving, from a first UT via a satellite of the satellite system, a first portion of data on a plurality of subframes of the contention-based resources during a time period; and
   suspending the allocation of the contention-based resources to the first UT after an expiration of the time period or upon a grant of scheduled return link resources to the first UT, irrespective of collisions on the contention-based resources.

2. The method of claim 1, wherein the activation signal is transmitted via a dedicated physical forward link control channel (PFCCH) that is independent of the contention-based resources.

3. The method of claim 1, wherein the activation signal indicates a modulation and coding scheme (MCS) to be used by the plurality of UTs when transmitting data on the contention-based resources.

4. The method of claim 1, wherein reception of at least part of the first portion of the data comprises an implicit scheduling request for the grant of scheduled return link resources.

5. The method of claim 1, further comprising:
   receiving, during the time period on a dedicated physical return link control channel (PRCCH) that is independent of the contention-based resources, a scheduling request for scheduled return link resources of the satellite system.

6. The method of claim 5, wherein the PRCCH is allocated to the first UT only between selected pairs of subframes of the contention-based resources.

7. The method of claim 5, further comprising:
   transmitting the grant for the return link resources in response to the received scheduling request; and
   receiving a second portion of the data on the scheduled return link resources during the time period.

8. The method of claim 7, wherein transmission of the grant terminates the allocation of the contention-based resources to the first UT.

9. The method of claim 1, further comprising:
   transmitting a grant for the return link resources after expiration of the time period;
   receiving a second portion of the data on the scheduled return link resources after the expiration of the time period; and
   terminating data transmissions on the contention-based resources in response to transmitting the grant.

10. The method of claim 1, wherein the activation signal assigns a unique demodulation reference signal (DM-RS) shift to the first UT.

11. The method of claim 1, further comprising:
    receiving, on the contention-based resources, a buffer status report (BSR) indicating an amount of data stored in a buffer of the first UT.

12. The method of claim 1, further comprising:
    detecting a collision on the contention-based resources;
    identifying one or more of the plurality of UTs that transmitted data associated with the collision based on unique demodulation reference signal (DM-RS) shifts assigned to the plurality of UTs; and
    requesting the one or more identified UTs to re-transmit the data on the scheduled return link resources.

13. A network controller configured for wireless communication in a satellite system, the network controller comprising:
    one or more processors; and
    a memory storing instructions that, when executed by the one or more processors, cause the network controller to:
      allocate contention-based resources of the satellite system to a plurality of user terminals (UTs);
      activate the allocated contention-based resources by transmitting an activation signal to the plurality of UTs;
      receive, from a first UT via a satellite of the satellite system, a first portion of data on a plurality of subframes of the contention-based resources during a time period; and
      suspend the allocation of the contention-based resources to the first UT after an expiration of the time period or upon a grant of scheduled return link resources to the first UT, irrespective of collisions on the contention-based resources.

14. The network controller of claim 13, wherein the activation signal is transmitted via a dedicated physical forward link control channel (PFCCH) that is independent of the contention-based resources.

15. The network controller of claim 13, wherein the activation signal indicates a modulation and coding scheme (MCS) to be used by the plurality of UTs when transmitting data on the contention-based resources.

16. The network controller of claim 13, wherein reception of at least part of the first portion of the data comprises an implicit scheduling request for the grant of scheduled return link resources.

17. The network controller of claim 13, wherein execution of the instructions causes the network controller to further:
    receive, during the time period on a dedicated physical return link control channel (PRCCH) that is independent of the contention-based resources, a scheduling request for scheduled return link resources of the satellite system.

18. The network controller of claim 17, wherein the PRCCH is allocated to the first UT only between selected pairs of subframes of the contention-based resources.

19. The network controller of claim 17, wherein execution of the instructions causes the network controller to further:
    transmit the grant for the return link resources in response to the received scheduling request; and
    receive a second portion of the data on the scheduled return link resources during the time period.

20. The network controller of claim 19, wherein transmission of the grant terminates the allocation of the contention-based resources to the first UT.

21. The network controller of claim 13, wherein execution of the instructions causes the network controller to further:
    transmit a grant for the return link resources after expiration of the time period;

receive a second portion of the data on the scheduled return link resources after the expiration of the time period; and terminate data transmissions on the contention-based resources in response to transmitting the grant.

22. The network controller of claim 13, wherein the activation signal assigns a unique demodulation reference signal (DM-RS) shift to the first UT.

23. The network controller of claim 13, wherein execution of the instructions causes the network controller to further:
receive, on the contention-based resources, a buffer status report (BSR) indicating an amount of data stored in a buffer of the first UT.

24. The network controller of claim 13, wherein execution of the instructions causes the network controller to further:
detect a collision on the contention-based resources;
identify one or more of the plurality of UTs that transmitted data associated with the collision based on unique demodulation reference signal (DM-RS) shifts assigned to the plurality of UTs; and
request the one or more identified UTs to re-transmit the data on the scheduled return link resources.

\* \* \* \* \*